(12) United States Patent
Kasevich et al.

(10) Patent No.: US 7,317,184 B2
(45) Date of Patent: Jan. 8, 2008

(54) KINEMATIC SENSORS EMPLOYING ATOM INTERFEROMETER PHASES

(75) Inventors: Mark A. Kasevich, Palo Alto, CA (US); Boris Dubetsky, East Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 180 days.

(21) Appl. No.: 11/346,599

(22) Filed: Feb. 1, 2006

(65) Prior Publication Data

US 2006/0249666 A1    Nov. 9, 2006

Related U.S. Application Data

(60) Provisional application No. 60/649,302, filed on Feb. 1, 2005.

(51) Int. Cl.
*H05H 3/00* (2006.01)
*G01C 21/16* (2006.01)

(52) U.S. Cl. ............ 250/251; 701/200; 701/208; 701/220; 702/152

(58) Field of Classification Search ............ None
See application file for complete search history.

(56) References Cited

U.S. PATENT DOCUMENTS

| 3,761,721 | A | 9/1973 | Altshuler et al. | 250/41.3 |
|---|---|---|---|---|
| 4,874,942 | A | 10/1989 | Clauser | 250/251 |
| 4,992,656 | A | 2/1991 | Clauser | 250/251 |
| 5,274,231 | A | 12/1993 | Chu et al. | 250/251 |
| 5,274,232 | A | 12/1993 | Chu et al. | 250/251 |
| 7,142,983 | B2 * | 11/2006 | Huddle | 701/220 |

* cited by examiner

*Primary Examiner*—Jack I. Berman
(74) *Attorney, Agent, or Firm*—Lumen Intellectual Property Services, Inc.

(57) ABSTRACT

An apparatus and method for determining the coordinates of a body, where the coordinates express the body's inertial or kinematic properties, including, for example, its trajectory. The apparatus and method employ atom interferometers provided in a body frame X of the body whose inertial or kinematic properties are to be studied. During operation, interfering entities used by the atom interferometers are released into a known frame X', such as an inertial frame or the Earth frame $X_e$, that is decoupled from the body frame X and an optical pulse sequence is applied to the interfering entities to affect the quantum-mechanical matter-wave phases of the interfering entities as a function of the coordinates. Under these conditions, the coordinates of the body are determined from the phases of the atom interferometers and analytic expressions for the trajectories of the interfering entities under the simultaneous action of the gravity gradient, Coriolis and centrifugal forces.

20 Claims, 13 Drawing Sheets

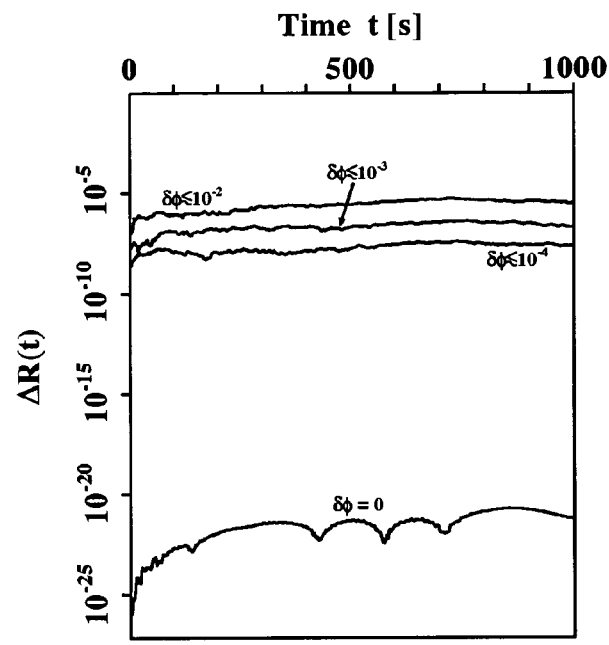
FIG. 8
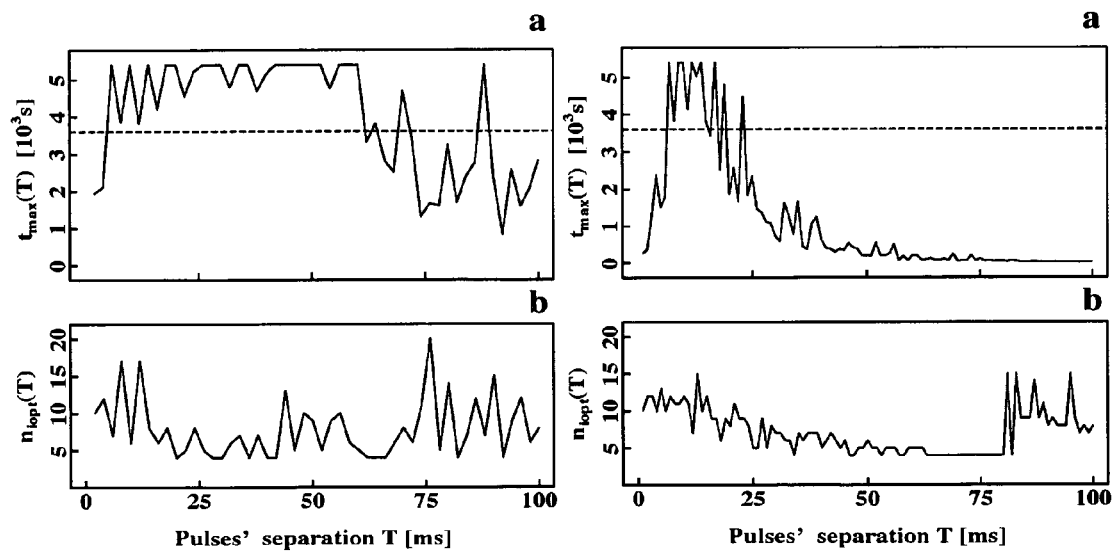
FIG. 9A  FIG. 9B

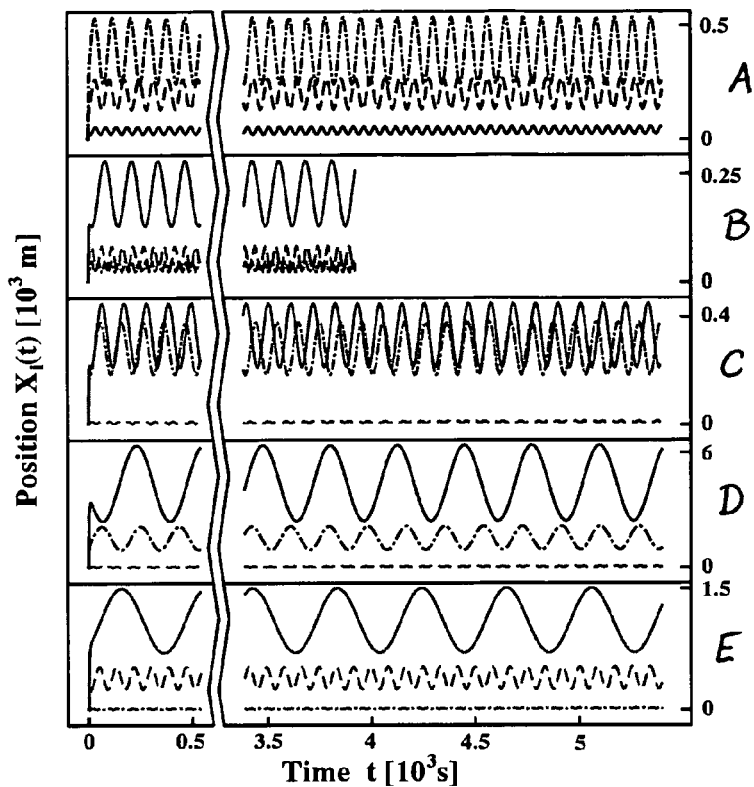
FIG. 10
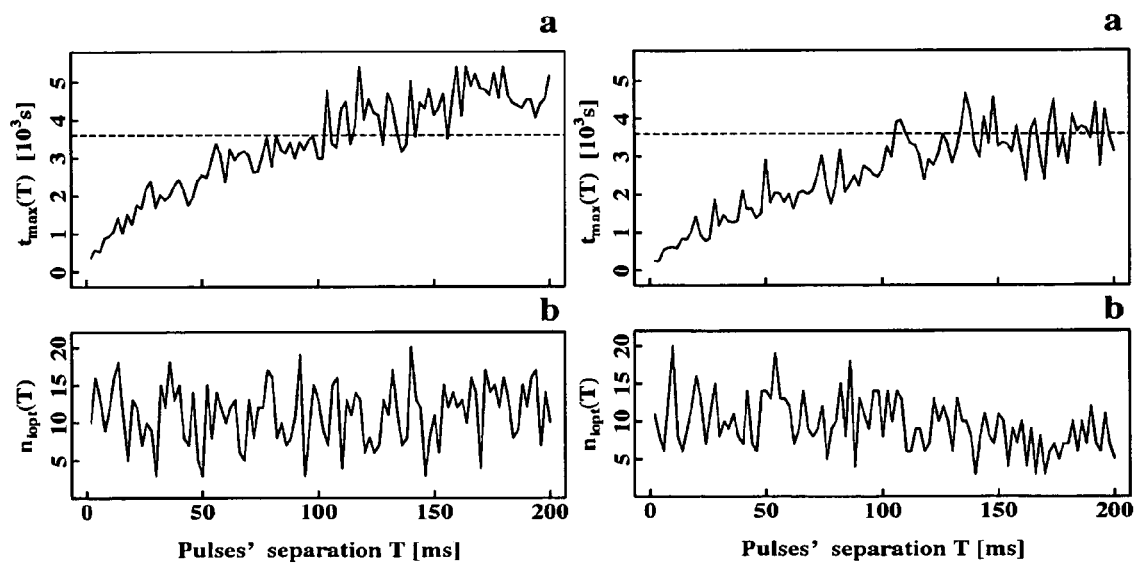
FIG. 11A  FIG. 11B

FIG. 11C  FIG. 11D

KINEMATIC SENSORS EMPLOYING ATOM INTERFEROMETER PHASES

CROSS-REFERENCE TO RELATED APPLICATIONS

This application claims priority from provisional U.S. patent application No. 60/649,302 filed on Feb. 1, 2005 and herein incorporated in its entirety.

GOVERNMENT SPONSORSHIP

This application was supported under grant number W911NF-04-1-0047 awarded by DARPA, thereby affording the government certain rights in this invention.

FIELD OF THE INVENTION

The present invention relates generally to kinematic navigation employing the quantum effect of atom interference and more particularly the invention allows to navigate by directly using the atom interferometer's phases and without using any accelerometers or gyroscopes.

BACKGROUND OF THE INVENTION

For the purposes of the present invention atom interferometry refers generally to quantum mechanical interference processes that involve entities having a rest mass. Among other, such entities include atoms, ions and molecules. For a general overview of the quantum mechanical process of matter-wave interferometry the reader is referred to U.S. Pat. No. 3,761,721 to Altshuler and Franz. For a review of how matter-wave interferometry is applied in constructing inertial sensors the reader is further referred to U.S. Pat. Nos. 4,874,942 and 4,992,656 to John F. Clauser and the references cited therein.

Applications of atom interferometry in measuring kinematic properties of the various entities such as their velocities and accelerations have been explored in more detail by Chu et al. in U.S. Pat. Nos. 5,274,231 and 5,274,232. These references teach the use of the Raman process to induce internal energy transitions and thus affect the internal energy state of the entity as well as other kinematic properties such as its momentum or velocity. More precisely, pulses of electromagnetic energy are applied to the entity to stimulate transitions between non-radiative energy levels. The detuning of the electromagnetic pulses, i.e., the difference between the energy levels of the transition and the energy imparted by the electromagnetic pulses allows one to control the distribution of velocities among the entities. Precise control of the velocity distribution permits high accuracy measurements of properties such as velocities and accelerations. In turn, such precise measurements allow one to build more accurate kinematic sensors such as accelerometers and gyroscopes.

For practical inertial or kinematic navigation the kinematic properties, e.g., accelerations and rotation frequencies of the traveling object need not only be measured accurately but also frequently. In fact, for most navigation purposes the kinematic properties of the moving objects should be measured at time intervals on the order of 1 ms. Unfortunately, the best measurement accuracy in atom interferometers is obtained when measurements are performed over time intervals ranging from 10 ms to 500 ms since the accuracy of an atom interferometric measurement increases with measurement time. Hence, prior art atom interferometric sensors designed to serve as accelerometers or gyroscopes are not sufficiently quick for applications in precise kinematic navigation.

OBJECTS AND ADVANTAGES

In view of the above shortcomings of the prior art, the present invention has as its objective to provide a method and an apparatus that permit direct use of atom interferometric phases, measured in time intervals optimal for the atom interferometry, for inertial or kinematic navigation without measuring kinematic properties either at those times or in between of them.

It is another object of the invention, to provide a method and apparatus that can measure body trajectory with accuracy on the order of 5 m/hr or better, such that it can be used in terrestrial vehicle navigation.

Still other objects and advantages will become apparent from the ensuing description.

SUMMARY OF THE INVENTION

The object and advantages of the invention are addressed by a method for determining the coordinates of a body, where the coordinates express the body's inertial or kinematic properties, including, for example, its trajectory. In accordance with the method, atom interferometers are provided in a body frame X of the body whose inertial or kinematic properties are to be studied. During operation, interfering entities used by the atom interferometers are released into a known frame X' that is decoupled from the body frame X. An optical pulse sequence is then applied to the interfering entities to affect the quantum-mechanical matter-wave phases of the interfering entities as a function of the coordinates. Under these conditions, the coordinates of the body are determined from the phases of the atom interferometers. The optical pulse sequence can comprise a $\pi/2$-$\pi$-$\pi/2$ sequence or some other sequence. The pulse sequence can also be a Raman pulse sequence.

In a preferred embodiment the atom interferometers are triggered at regular time intervals. The interfering entities do not necessarily have to be atoms, and may include any objects exhibiting quantum-mechanical matter-wave interference properties. Thus, in general, the interfering entities may consist of atoms, ions and molecules and clusters. In case of using atoms, it is preferable to release them into the known frame X' in the form of a gas cloud.

In one specific embodiment, the atom interferometers include basic atom interferometers for operating on interfering entities released at an initial time $t_0$ and a zero initial velocity $v_0=0$ in the body frame X. There are preferably three such basic atom interferometers aligned with three orthogonal axes, e.g., the three axes of a Cartesian coordinate system. Additional atom interferometers are provided for operating on interfering entities released at the initial time $t_0$ and at a non-zero initial velocity $v_0 \neq 0$ in the body frame X. When equipped with basic and additional atom interferometers in this manner, the body rotation matrices R can be determined from phase differences between the basic and the additional atom interferometers and from rotation matrices R restored for preceding measurement times. Body coordinates can also be determined from the phases of the basic atom interferometers, restored rotation matrices R, and body coordinates restored from preceding measurement times and body velocities at the times of releasing the interfering entities.

In some embodiments of the method, the velocity of the body at the time of releasing the interfering entities for subsequent atom interferometric measurements is obtained by interpolation from restored body positions. Depending on the specific implementation of the method, the velocity of the body can be measured at predetermined body positions or the velocity of the body can be excluded.

In terrestrial applications, the method is practiced in situations where the known frame X' is the Earth frame $X_e$. For reasons of accuracy, it is important that in these applications the initial velocity of the interfering entities released at initial time $t_0$ in the Earth frame $X_e$ be sufficiently small to allow the Earth's gravity potential V(r) to be expressed by the following expression:

$$V(\vec{r}) = V_0 - \vec{x} \cdot \vec{g}_e - T_{ik} x_i x_k,$$

where $g_e$ is gravity acceleration and $T_{ik}$ is gravity gradient tensor. Also, especially when tracking the trajectory of the body over longer distances, it is advantageous that the Earth's gravity potential include both a normal gravity potential $V^{(n)}(r)$ and an anomalous gravity potential $V^{(a)}(r)$.

The invention further extends to an apparatus for determining the coordinates of the body. The apparatus has atom interferometers that are mounted in the body frame X, e.g., by being firmly attached to the body at a convenient location. The atom interferometers use interfering entities that are released into the known frame X' which is decoupled from the body frame X. Furthermore, the apparatus has a source for applying an optical pulse sequence to the interfering entities and thereby affect the matter-wave phases of the interfering entities as a function of the coordinates. The apparatus has a unit that determines the coordinates of the body from the phases of the atom interferometers.

The apparatus can use basic atom interferometers and additional atom interferometers for operating on interfering entities released at zero and non-zero initial velocities $v_0$ in body frame X. The interfering entities can be atoms, ions, molecules or clusters.

The apparatus can be employed in any body, for example a vehicle, that moves on the surface of the Earth, in the Earth's atmosphere, in outer space or indeed any environment that is inertial or non-inertial. In many applications, the vehicle will be earth-bound and therefore be confined to trajectories in the Earth frame.

The specific embodiments of the apparatus and particular applications of the method are described in the below detailed description with reference to the drawing figures.

BRIEF DESCRIPTION OF THE DRAWING FIGURES

FIG. 8 is a graph of the time dependence of the error in rotation matrix restoration for different levels of error in interferometer phases $\delta\phi$.

FIG. 9A-E are graphs illustrating the maximum time for body motion restoration and optimum number of interpolation points as a function of time delay between pulses for oscillatory body motion.

FIG. 10 are graphs of initial and final portions of body motion, exact and restored using atom interferometer phases and interpolation in accordance with the invention for oscillatory body motion.

FIG. 11A-E are graphs illustrating the maximum time for body motion restoration and optimum number of interpolation points as a function of time delay between pulses for pulsed body motion.

FIG. 12A-E are graphs of initial and final portions of body motion, exact and restored using atom interferometer phases and interpolation in accordance with the invention for pulsed body motion.

Figure 13:
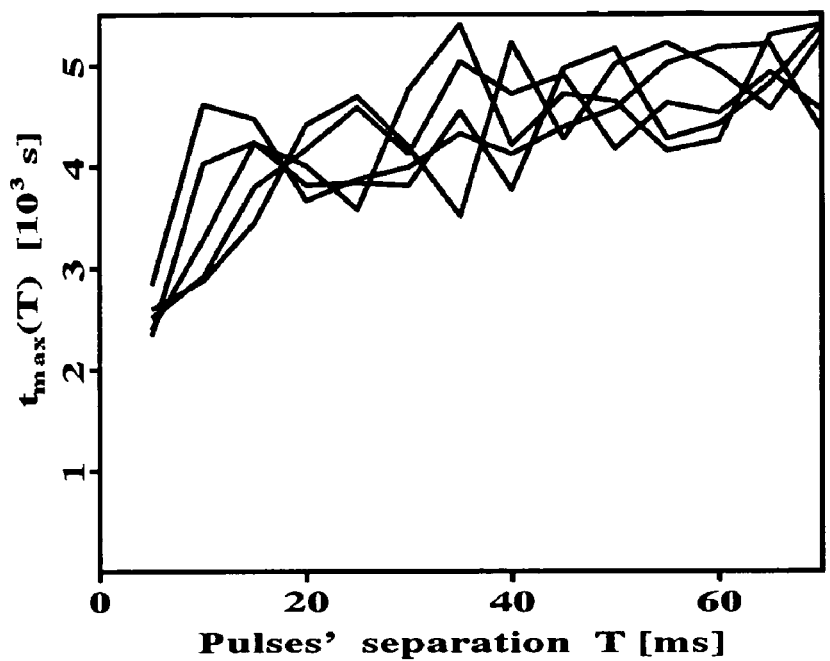

FIG. 13 are graphs for simulations of five different trajectories of a body moving the Earth frame illustrating the dependence of the maximum navigation time on the time delay T between Raman pulses.

Figure 14:
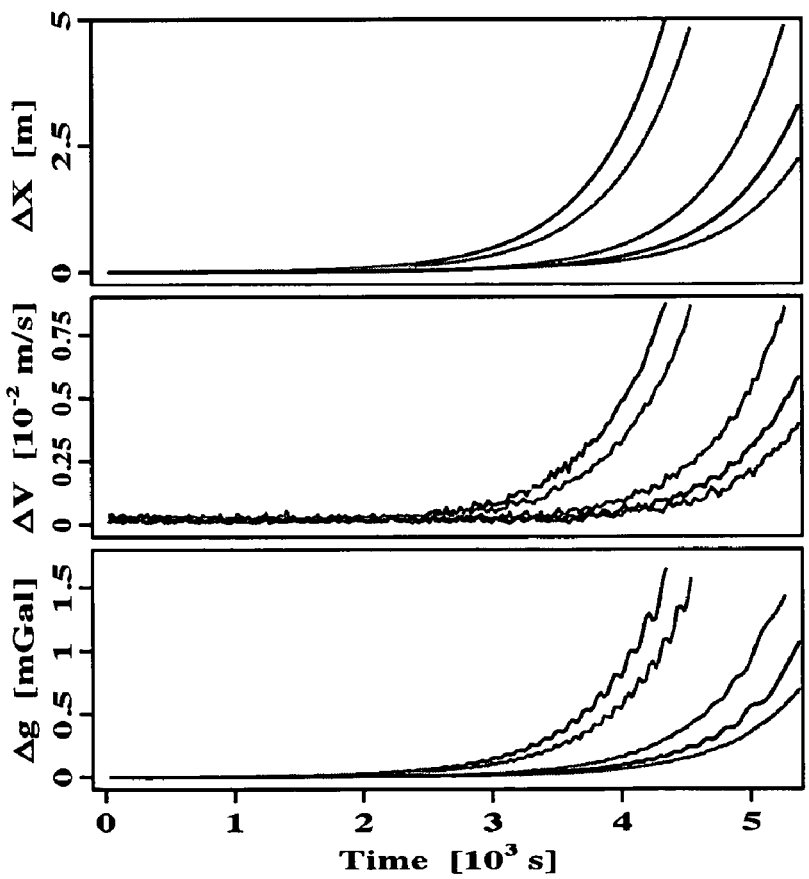

FIG. 14 are graphs for the simulations of FIG. 13 showing the build up of error in body position, body velocity and gravity acceleration during the navigation process.

DETAILED DESCRIPTION

Figure 1:
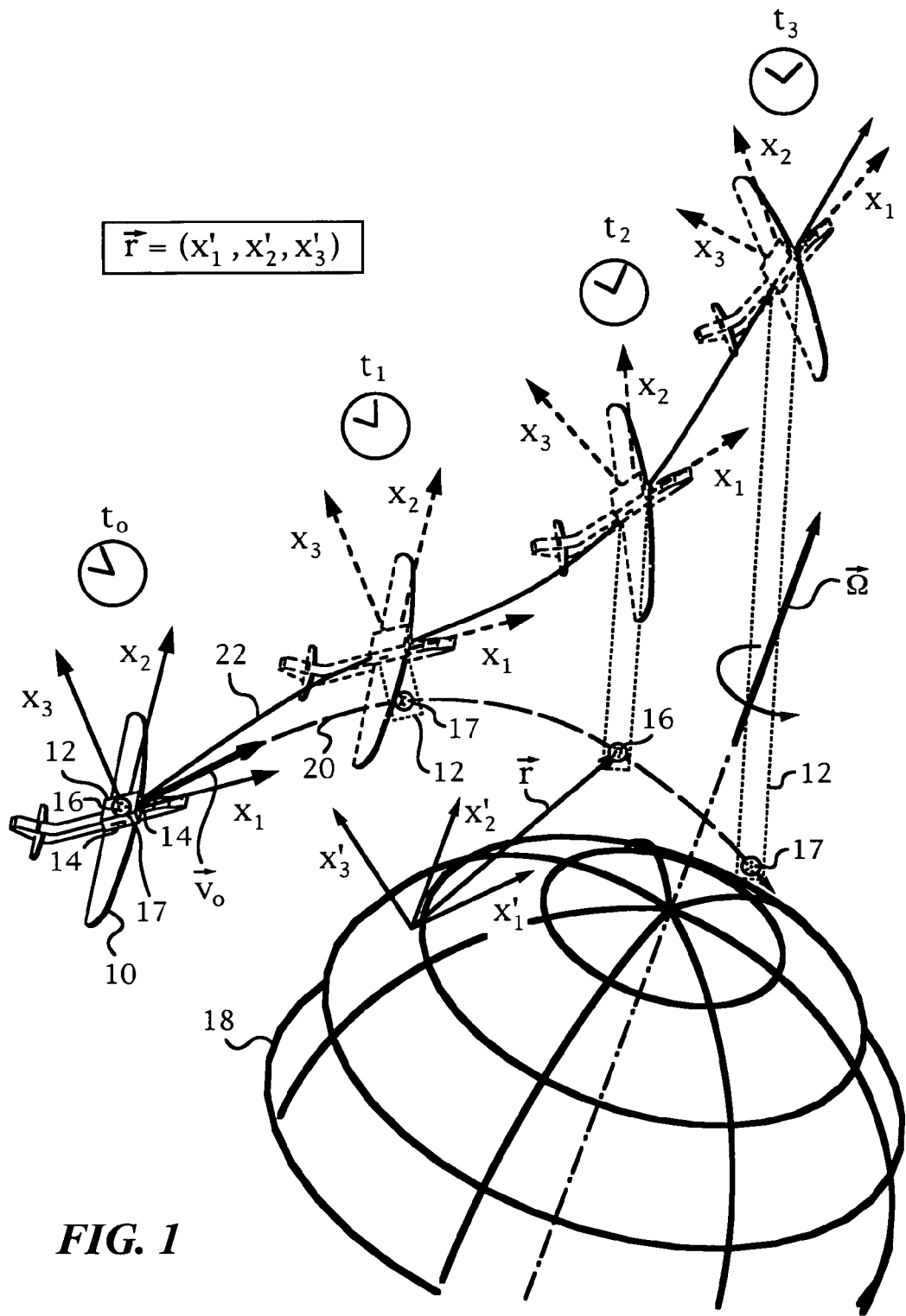
FIG. 1 is a three-dimensional diagram illustrating the basic principles of the apparatus and method of the invention.

FIG. 1 illustrates a body 10 whose coordinates are to be determined. In the example shown, body 10 is a vehicle, and in particular a plane. It should be noted that body 10 can be any vehicle in the broadest sense of the term or indeed any object whose coordinates or motion is to be determined. In some cases, body refers to a navigation platform, as will be clear to person's skilled in the art. Body 10 may be earth-bound to move in the Earth's atmosphere, on its surface, in outer space or indeed in any inertial or non-inertial frame that is known and will be referred to as known frame X'.

Vehicle 10 has a unit 12 that houses a number of atom interferometers 14. Atom interferometers 14 are fixed in the non-inertial reference frame or body frame X of vehicle 10. In the present case, body frame X of vehicle 10 is described in Cartesian coordinates $x_1$, $x_2$, $x_3$. It will be understood by those skilled in the art, that depending on the symmetry and the trajectory of body 10 a different coordinate system, e.g., a spherical coordinate system can be employed.

At an initial time $t_0$ interfering entities 16 are released into the known frame X' that is decoupled from body frame X. The frame into which entities 16 are released can be an inertial or non-inertial frame X'. In outer space virtually no gravitational force acts on entities 16 and thus known frame X' is an inertial frame in which the motion of entities 16 is rectilinear. It should be noted that interfering entities 16 can be atoms, ions, molecules or any entities of matter that will undergo quantum-mechanical matter-wave interference capable of atom interferometric measurement.

In the present case, entities 16 are released near the Earth 18. Hence, known frame X' is the Earth frame and it is described in Cartesian coordinates $x'_1$, $x'_2$, $x'_3$. The Earth's gravitational field g and the Earth's rotation Ω determine the forces acting on entities 16 in Earth frame X'. In fact, once released into Earth frame X' entities 16 follow an inertial trajectory 20 that is governed by gravitational, Coriolis and centrifugal forces as well as gravity-gradient induced forces.

In the present embodiment, interfering entities 16 are atoms that form a gas cloud 17. Atoms 16 are released at an initial velocity $v_0$ as measured in body frame X. Initial velocity $v_0$ can be zero or non-zero. Note that boldface as well as superscripted arrows are used to denote vector quantities throughout the document.

In a preferred embodiment, atoms 16 are released at both a zero initial velocity $v_0=0$ and a non-zero initial velocity $v_0 \neq 0$ such that interferometeric measurements can be performed by atom interferometers 14 on entities 16 with different initial velocities $v_0$ to help in recovering the coordinates in accordance with a preferred method. Although only two atom interferometers 14 having optical pulses propagating along axes $x_1$ and $x_2$ are shown in FIG. 1, it is understood that more can be used.

Over time, vehicle 10 executes a body motion that is described by a trajectory 22. In addition to following trajectory 22, vehicle 10 also changes its orientation or undergoes rotation as expressed by a rotation matrix R. The trajectory of vehicle 10 can be described by its position in time, or X(t). It is an objective of the method and apparatus of the invention to keep the error $\Delta X$ of this navigation method to less than 5 m over the course of one hour or:

$$\Delta X < 5 \text{ m.} \qquad \text{Eq. 1}$$

Note that unit 12 is indicated in a dashed line and gas cloud 17 of gas atoms 16 is shown following inertial trajectory 20 that extends outside vehicle 10. This is done for illustrative purposes to clearly show how gas atoms 16 once released into Earth frame X' follow inertial trajectory 20 instead of the non-inertial trajectory 22 and rotation enforced on plane 10 by its propulsion system and aerodynamic forces. In practice, the method of invention is performed on short time scales such that entities 16 do not travel outside a small unit 12 during the measurement.

Figure 3:
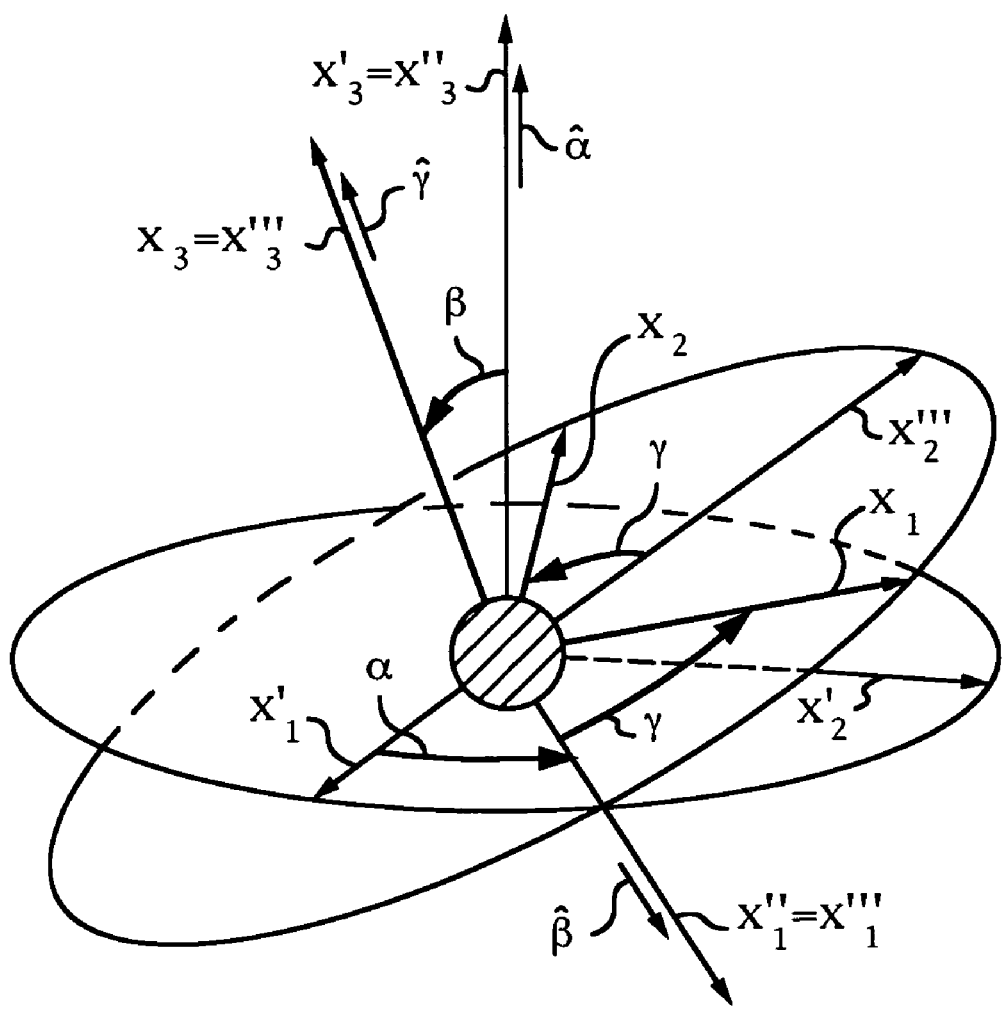
FIG. 3 is a diagram illustrating how Euler angles can be used in rotation matrices R.

Specifically, after release of atoms 16 at initial time $t_0$ an optical pulse sequence 24 is applied to them at times $t_0+t_1$, $t_0+t_1+T$, $t_0+t_1+2T$, where $t_1$ is a possible time delay between the release or launching times of atoms 16 and the application of the first optical pulse and T is the time separation between the pulses of the sequence. In this particular case sequence 24 is a Raman pulse sequence and $X_1, R_1; X_2, R_2; X_3, R_3$ correspond to the coordinates and the rotation matrices R of body frame X at times $t_0+t_1$, $t_0+t_1+T$, $t_0+t_1+2T$. The Euler angle convention used in rotation matrices R that quantify the rotation of body frame X is illustrated in FIG. 3. For a more thorough treatment of Euler angles and rotation conventions the reader is referred to Chapter 4 of Goldstein et al., Classical Mechanics, $3^{rd}$ Edition, Addison Wesley 2002.

Pulse sequence 24 is preferably a $\pi/2$-$\pi$-$\pi/2$ sequence of Raman pulses spaced at equal time intervals T. In other words, the Raman pulses occur with time delay T after an initial time $t_0=0$ at which entities 16 are released into Earth frame $X_e$ and at discrete subsequent times that can be described as $t=jT$, where $j=0, 1, 2$. Before considering the complete description of the motion of entities 16 after their release into Earth frame $X_e$ it is useful to first review the basic principles of operation of atom interferometers 14.

Figure 2:
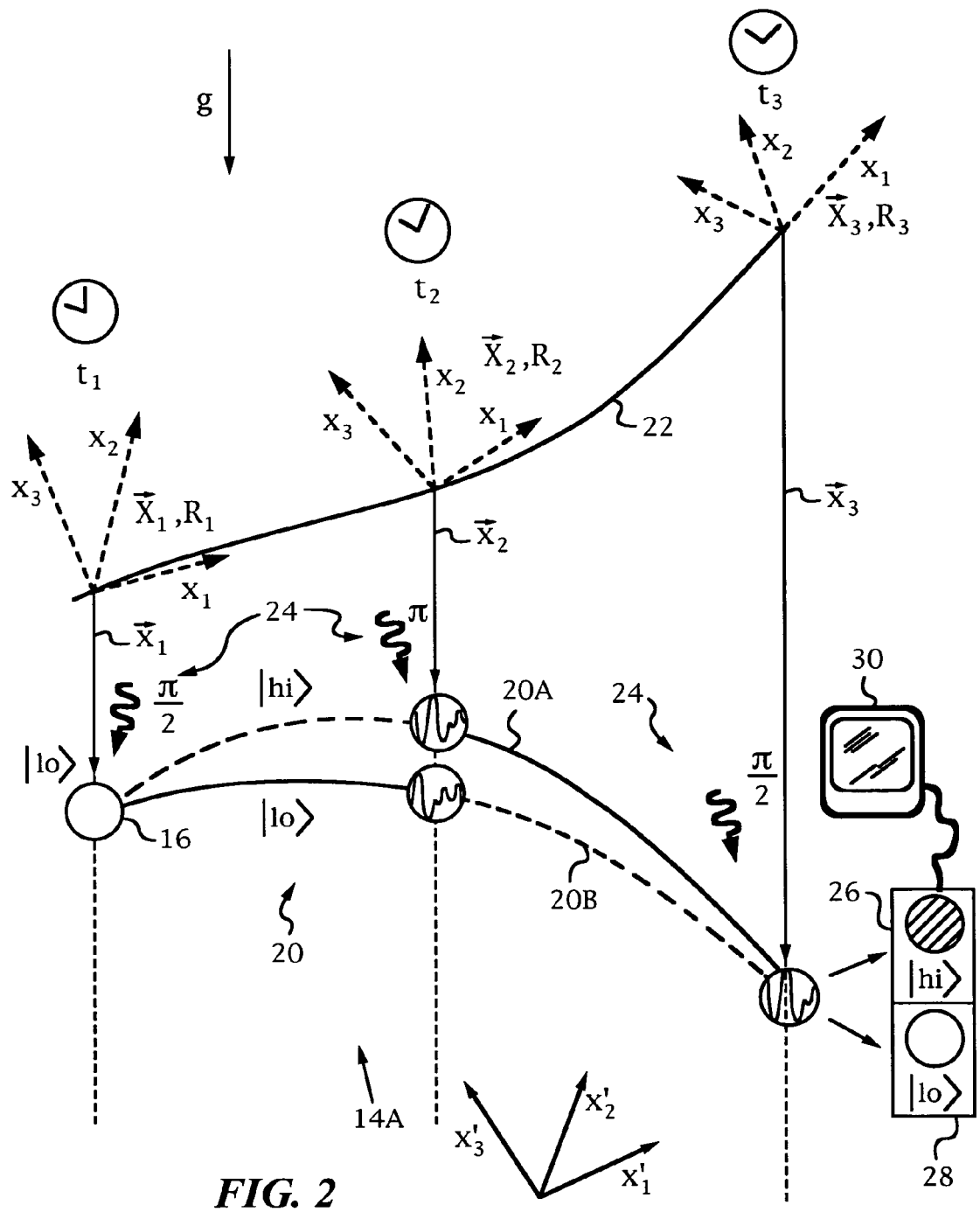
FIG. 2 is a diagram illustrating some operational details of the quantum-mechanical matter-wave interference mechanism employed by the invention.

In the diagram of FIG. 2 only one gas atom 16 is shown in one of atom interferometers 14, namely atom interferometer 14A. Atom 16 can be in a low energy state |lo> or a high energy state |hi>. Note that low |lo> and high |hi> energy states as used herein are purposely general, but given specific atoms 16 respective specific energy states of those atoms 16 will be used. The wavelengths of the radiation in optical pulses 24 are selected to operate on a transition between low |lo> and high |hi> energy states and thus separate the matter-waves associated with atom 16. Once separated, the matter-waves associated with low |lo> and high |hi> energy states follow inertial trajectory 20 along slightly different paths. In particular, matter-waves associated with low energy state |lo> follow a path 20A and matter-waves associated with high energy state |hi> follow a path 20B.

The splitting of inertial trajectory 20 into paths 20A, 20B and different evolution of matter-waves propagating along paths 20A, 20B gives rise to the quantum interference effect used in this invention. The phases of the matter-waves undergo different amounts of change depending on their path as well as applied optical pulse sequence 24. Since body frame X in which optical pulse sequence 24 is generated moves along with body 10 relative to paths 20A, 20B the coordinates of body 10 affect the optical pulses sequence 24 that acts on the matter-waves propagating along paths 20A, 20B. More precisely, optical pulse sequence 24 affects matter-wave phases of interfering entities 16 as a function of the coordinates of body 10.

The application of optical pulse sequence 24 affects the phases of the two interfering matter-wave packets on paths 20A, 20B and yields different measurement results at outputs 26, 28 of interferometer 14A. In other words, different numbers of atoms 16 are measured at output 26 in high energy state |hi> and at output 28 in low energy state |lo> as a function of position and rotation of body frame X. The coordinates and rotation matrices acting on body frame X, or equivalently on body 10, are determined by a unit 30 from the phases of a number of interferometers 14.

Additional information about the use of Raman pulse sequences for atom interferometric measurements on entities in the inertial frame of reference is contained in Kai Bongs, et al., "High-order inertial phase shifts for time-domain atom interferometers", Physics Department, Yale University, 25 Feb. 2003 published on the web at http://xxx.lanl.gov/abs/quant-ph/0204102, which is herein incorporated by reference. It should be noted that any suitable type of optical excitation method may be used, including single photon, two photon (Raman) and multi-photon (3 photon and higher) excitations.

Operation Without Body Rotation and in the Absence of Gravity

Figure 4:
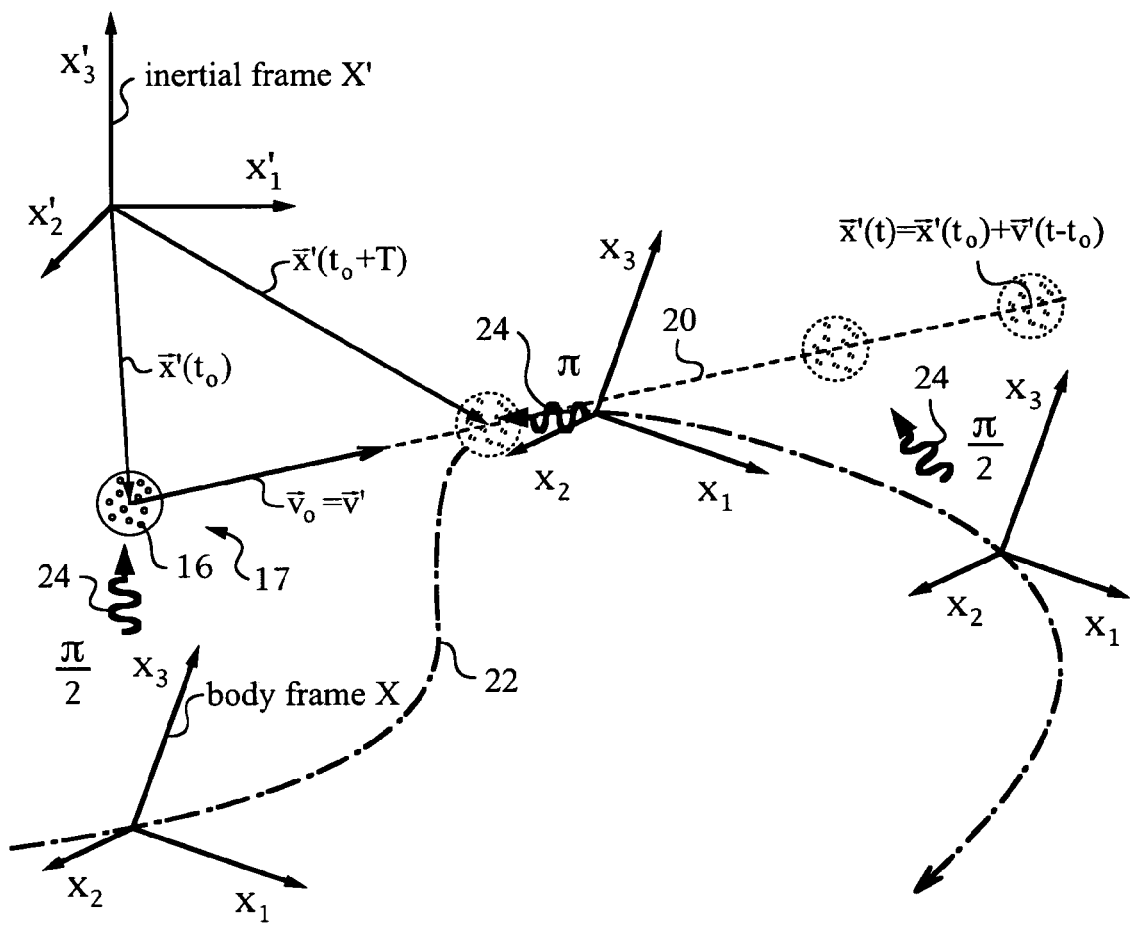
FIG. 4 is a diagram illustrating the method of invention in the case where the known frame is an inertial frame and the body undergoes no rotation.

To best understand the method of invention in detail, it is instructive to first consider the simplest case in which vehicle 10 is moving in an environment without gravity and undergoes no rotation, as shown in the diagram of FIG. 4. In other words, known frame X' is an inertial frame, and body frame X follows a trajectory 22 but does not rotate. When interfering entities 16 are released as a gas cloud 17 into inertial frame X' at initial time $t_0$, the initial velocity $v_0$ at which entities 16 are released in body frame X does not change with time. This means that trajectory 20 of entities 16 follows a straight line in inertial frame X'; i.e., trajectory 20 is rectilinear. In some embodiments initial velocity $v_0$ in body frame X is zero and in some other embodiments it is non-zero, depending on application and as will be discussed below.

Pulse sequence 24 is a $\pi/2$-$\pi$-$\pi/2$ sequence of Raman pulses spaced at equal time intervals T. In other words, the Raman pulses occur with time delay T after an initial time $t_0=0$ at which entities 16 are released into inertial frame X' and at discrete subsequent times T and 2T. Under these conditions, the interference between the different atomic passes has a phase φ given by:

$$\phi = \vec{k} \, [\vec{x}(t_0) - 2\vec{x}(t_0+T) + \vec{x}(t_0+2T)], \qquad \text{Eq. 2}$$

where k is an effective wave vector associated with the Raman process, $$\vec{x}(t) = \vec{x}'(t) - \vec{X}(t) \qquad \text{Eq. 3}$$

x(t) and x'(t) are positions of the center of cloud 17 in noninertial body frame X and inertial frame X'. Since in inertial frame X' entities 16 move with constant velocity v', trajectory 20 is described by:

$$\vec{x}'(t) = \vec{x}'(t_0) + \vec{v}'(t-t_0), \qquad \text{Eq. 4}$$

and thus, in body frame X one finds:

$$\vec{x}(t) = \vec{x}(t_0) + \vec{X}(t_0) - \vec{X}(t) + \vec{v}'(t-t_0). \qquad \text{Eq. 5}$$

Substituting equation 5 into equation 2, we can see that in the absence of rotation, interferometer phase is velocity insensitive and can be expressed in body frame X by:

$$\phi = -\vec{k}\,[\vec{X}(t_0) - 2\vec{X}(t_0+T) + \vec{X}(t_0+2T)]. \qquad \text{Eq. 6}$$

Since the interferometers are launched when entities 16 are released at times $t_0=jT$, and the corresponding phases $\phi_j$ are measured, one can express $X_{j+2}$ through $X_{j+1}$ and $X_j$ and restore step by step trajectory 22 of vehicle 10 at these times when $X_0$ and $X_1$ are known. To accomplish this, we rewrite equation 6 as:

$$\delta X_j = \delta X_{j-1} - \phi_{j-2}, \; j \geq 2, \qquad \text{Eq. 7}$$

where $\delta X_j = X_j - X_{j-1}$, $X_j = \vec{k} \cdot \vec{X}_j$, and find its solution, $$\delta X_j = \delta X_1 - \sum_{j'=0}^{j-2} \phi_{j'},$$

from which $$X_j = X_o + j\delta X_1 - \sum_{j'=2}^{j} \sum_{j''=0}^{j'-2} \phi_{j''}.$$

Changing the order of summation we obtain the expression:

$$X_j = X_o + j\delta X_1 - \sum_{j'=0}^{j-2} (j - j' - 1)\phi_{j'}; \; j \geq 2. \qquad \text{Eq. 8}$$

In cases where vehicle 10 acceleration is constant, we know that $\phi_j = -\vec{k} \cdot \vec{a}\,T^2$. In this case, since $$\vec{X}_1 = \vec{X}_o + \vec{V}_o T + \frac{\vec{a}T^2}{2},$$

where $V_0$ is the platform/body velocity—equation 8 reduces to the simple expression:

$$X_j = \vec{k}\left[\vec{X}_o + \vec{V}_o jT + \frac{\vec{a}j^2 T^2}{2}\right]. \qquad \text{Eq. 9}$$

Figure 5:
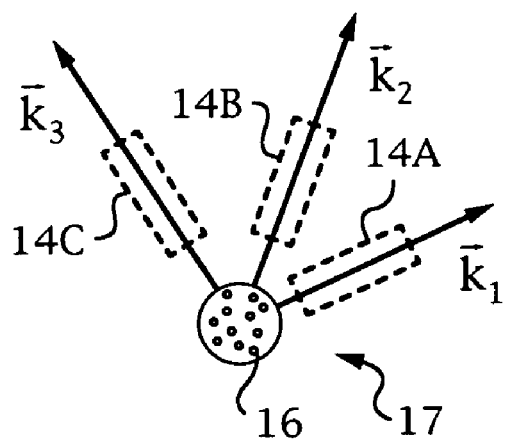
FIG. 5 is a diagram illustrating the use of three interferometers to recover body trajectory in the case shown in FIG. 4.

We thus see that three interferometers 14A, 14B and 14C having mutually perpendicular wave vectors $k_1$, $k_2$, and $k_3$ as shown in FIG. 5, are sufficient to restore trajectory 22 of vehicle 10 without measuring body acceleration and velocity if the positions of vehicle 10 at moments X(0) and X(T) are premeasured independently.

Figure 6:
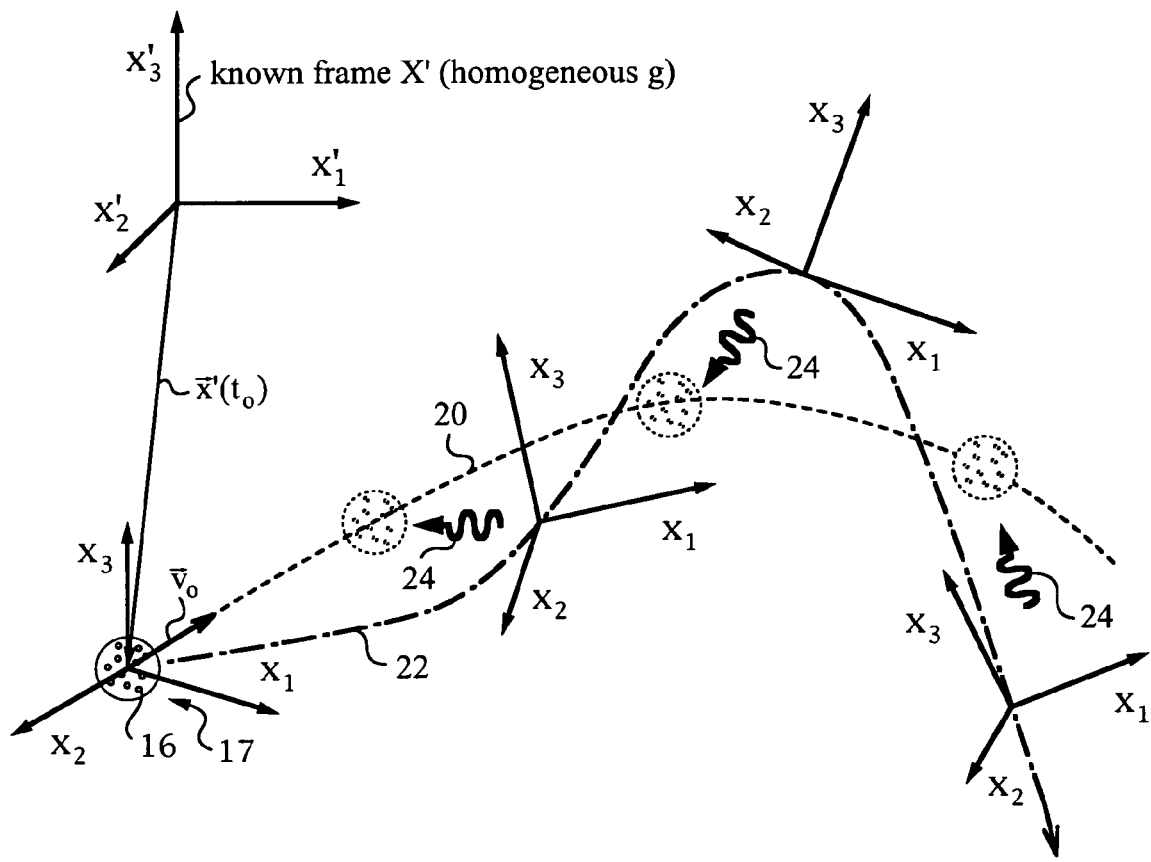
FIG. 6 is a three-dimensional diagram showing a way of practicing the method when the known frame X' is a homogeneous gravity frame and the body rotates.

Operation Including Body Rotation in an Inertial Frame with a Homogeneous Gravity Field FIG. 6 illustrates an application where vehicle 10 undergoes rotation during its motion in a known frame X' that is inertial. The rotation is described by rotation matrix R(t). When one calculates interferometers' phases in the inertial frame, R(t) (just like vehicle position X(t) in the case of FIG. 4) has to be treated as an unknown matrix which has to be restored from the values of the phases.

Although the rotation between phase measurements can be significant, we can assume for simplicity of explanation, that rotation is small during the corresponding motion of vehicle 10. In other words, the rotation matrix can be expressed by:

$$R(t) \approx \begin{pmatrix} 1 & \psi_3(t) & -\psi_2(t) \\ -\psi_3(t) & 1 & \psi_1(t) \\ \psi_2(t) & -\psi_1(t) & 1 \end{pmatrix}, \qquad \text{Eq. 10}$$

where $$\vec{\psi}(t) = \int_0^t dt' \vec{\Omega}(t'), \qquad \text{Eq. 11}$$

and Ω(t) is the rotation frequency.

The trajectory 20 of cloud 17 of entities 16, in this case atoms, in inertial frame X' is still given by equation 4. Meanwhile, in the noninertial body frame X the motion of cloud 17 is described by:

$$\vec{x}(t) = [1 - \vec{\psi}(t) \times][\vec{x}'(t) - \vec{X}'(t)]. \qquad \text{Eq. 12}$$

Assuming for simplicity that cloud 17 is launched in the center of the noninertial body frame X, as shown in FIG. 6, we obtain from equation 12 $\vec{v}' = \vec{V} + [1 + \vec{\psi}(t_0) \times] \vec{v}_0$ (where V and $v_0$ are respectively the initial (at $t=t_0$) velocity of vehicle 10 and velocity of cloud 17 in body frame X), and therefore:

$$\vec{x}(t) = [1 - \vec{\psi}(t) \times][\vec{X}(t_0) - \vec{X}(t) + (t-t_0)\vec{V}] + (t-t_0)\{1 + [\vec{\psi}(t_0) - \vec{\psi}(t)] \times\}\vec{v}_0. \qquad \text{Eq. 13}$$

Since unknown rotation angles ψ(t) and position X(t) are coupled in equation 13, three interferometers 14A, 14B, and 14C (see FIG. 5) having mutually perpendicular wave vectors as used in the previous embodiment are not sufficient to determine the six unknowns. As a result, three additional interferometers 14D, 14E, and 14F have to be used in conjunction with interferometers 14A, 14B, and 14C. To be sensitive to the same rotation matrices and positions all interferometers 14 have to be synchronized.

In the present embodiment, entities 16 for interferometric measurement by the first three interferometers 14A, 14B, and 14C, referred to as basic interferometers (BI) are launched or released into inertial frame X' at zero initial velocity v=0. In addition, entities 16 for interferometric measurement with interferometers 14D, 14E, and 14F, referred to as additional interferometers (AI) are launched or released into inertial frame X' at a non-zero initial velocity v≠0. Also, delaying optical pulse sequence 24 of Raman pulses to affect matter-wave phases of interfering entities 16 to time $t_1$ after initial time $t_0$ is beneficial to the method. Pulse sequence 24 is thus a $\pi/2$-$\pi$-$\pi/2$ sequence of Raman pulses spaced at equal time intervals T commencing at time $t_0+t_1$ and at discrete subsequent times $t_0+t_1+T$ and $t_0+t_1+2T$. Under these conditions, we can express the phase through $X(t)$ and $\psi(t)$ as:

$$\phi(t_o, t_1, \vec{v}) = \vec{k} \cdot \vec{\chi}(t_o, t_1, \vec{v}); \text{ where} \qquad \text{Eq. 14a}$$

$$\vec{\chi}(t_o, t_1, \vec{v}) \equiv \vec{x}(t_o + t_1 + 2T) - \qquad \text{Eq. 14b}$$
$$2\vec{x}(t_o + t_1 + T) + \vec{x}(t_o + t_1)$$
$$= 2\left[1 - \vec{\psi}(t_o + t_1 + T) \times\right]\left[\vec{X}(t_o + t_1 + T) - \vec{X}(t_o)\right] -$$
$$\left[1 - \vec{\psi}(t_o + t_1 + 2T) \times\right]\left[\vec{X}(t_o + t_1 + 2T) - \vec{X}(t_o)\right] -$$
$$\left[1 - \vec{\psi}(t_o + t_1) \times\right]\left[\vec{X}(t_o + t_1) - \vec{X}(t_o)\right] +$$
$$\left[2(t_1 + T)\vec{\psi}(t_o + t_1 + T) - \qquad \text{Eq. 14c}\right.$$
$$(t_1 + 2T)\vec{\psi}(t_o + t_1 + 2T) -$$
$$\left. t_1\vec{\psi}(t_o + t_1)\right] \times \left(\vec{V} + \vec{v}\right).$$

For a given wave vector k the phase difference between AI and BI is sensitive only to the rotation angles $\psi$, $$\phi_r \equiv \phi(t_o, t_1, \vec{v}) - \phi(t_o, t_1, 0) \qquad \text{Eq. 15}$$
$$= \left[(t_1 + 2T)\vec{\psi}(t_o + t_1 + 2T) -\right.$$
$$\left. 2(t_1 + T)\vec{\psi}(t_o + t_1 + T) + t_1\vec{\psi}(t_o + t_1)\right] \cdot \left(\vec{k} \times \vec{v}\right)$$

and if angles at preceding times $t_0+t_1$ and $t_0+t_1+T$ are already known, then the vector $\vec{\psi}(t_0+t_1+2T)$ can be restored using phase difference 15. For example, to get $\psi_1(t_0+t_1+2T)$ one needs to use an AI in which atoms are launched along axis 3 and wave vector directed along axis 2, measure the phase difference between this AI and the BI having the same wave vector and get:

$$\psi_1(t_o + t_1 + 2T) = \qquad \text{Eq. 16}$$
$$\frac{1}{t_1 + 2T}\left[\frac{\phi_r}{kv} + 2(t_1 + T)\psi_1(t_o + t_1 + T) - t_1\psi_1(t_o + t_1)\right].$$

We see that this approach can be repeated with two additional AIs that have velocity vectors directed along axes 3 and 1 and wave vectors directed along axes 1 and 2, respectively to obtain $\psi_2(t_0+t_1+2T)$ and $\psi_3(t_0+t_1+2T)$ in the same manner.

It is important to underline that rotation angles $\psi$ can be restored step by step from phase differences $\phi_r$ only since they are not coupled to velocity V or position X of vehicle 10. In fact, because of the absence of such coupling, it is possible to restore the orientation of vehicle 10 with much greater accuracy than even its position.

After finding the vector $\psi(t)$, one can turn attention to the BI phases as follows:

$$\phi = \vec{k} \cdot \vec{\chi}(t_0, t_1, 0); \text{ where} \qquad \text{Eq. 17a}$$

$$\vec{\chi}(t_0, t_1, 0) = 2[1 - \vec{\psi}(t_0+t_1+T) \times][\vec{X}(t_0+t_1+T) -$$
$$\vec{X}(t_0)] - [1 - \vec{\psi}(t_0+t_1+2T) \times][\vec{X}(t_0+t_1+2T) -$$
$$\vec{X}(t_0)] - [1 - \vec{\psi}(t_0+t_1) \times][\vec{X}(t_0+t_1) - \vec{X}(t_0)] + [2(t_1T)$$
$$\vec{\psi}(t_0+t_1+T) - (t_1+2T)\vec{\psi}(t_0+t_1+2T) - t_1\vec{\psi}(t_0+t_1)] \times$$
$$\vec{V}. \qquad \text{Eq. 17b}$$

Note that at this point, since we have restored the orientation, the only unknown is body velocity vector V at the initial time $t_0$ when entities 16 were released. There are a number of techniques that can be used to obtain vector V.

The first technique is based on interpolation that employs atom interferometric measurements, which normally cannot be used for this purpose. In accordance with the invention, however, atom interferometric measurements are used to recover V by introducing a time delay between initial time $t_0$ at which entities 16 are released and the time when first Raman pulse is applied, namely $t_0+t_1$, as shown in FIG. 6. In one particular embodiment of this method, initial time $t_0=0$, V=0 and a number $6(n_i-2)$ interferometers launched at the times:

| | | | | Eq. 18 |
|---|---|---|---|---|
| interferometers 1...6 | $t_1 = 0$ | $T$ | $2T$ | |
| interferometers 7...12 | $t_1 = T$ | $2T$ | $3T$ | |
| $\vdots$ | $\vdots$ | $\vdots$ | $\vdots$ | |
| interferometers $6(n_i-3)+1...6(n_i-2)$ | $\cdots$ $t_1 = (n_i-3)T$, | $(n_i-2)T$, | $(n_i-1)T$ | |

Here we assume that both position X of vehicle 10 and rotation matrix R at times 0 and T are known. In this case the rotation angles $\psi_1$, $\psi_2$ and $\psi_3$ can be obtained by applying equation 16 as shown above. Since all clouds 17 are launched at the same time, namely at initial time $t_0$, the vehicle velocity vector V=0 for all of them. Now, by resolving equation 17b with respect to $X(t_0+t_1+2T)$ one restores body positions at all $n_i$ points t=0, . . . $(n_i-1)T$.

Since the last adjacent pair of times are $(n_i-2)T$ and $(n_i-1)T$, the latest times when the next set of $6(n_i-2)$ interferometers should be launched is $t_0=(n_i-2)T$, but in this case one needs to find body velocity V. For this purpose we fit trajectory 22 of vehicle 10 by an interpolation polynomial. For example, for $n_i=3$ one can use a linear fit:

$$\vec{V} \approx \frac{\vec{X}[2T] - \vec{X}[0]}{2T}, \qquad \text{Eq. 19}$$

while for larger number of interpolation points $n_i$, we use a third order interpolation polynomial, for which one finds:

$$\vec{V} \approx \frac{1}{6T}\{2\vec{X}[(n_i-1)T] + \qquad \text{Eq. 20}$$
$$3\vec{X}[(n_i-2)T] - 6\vec{X}[(n_i-3)T] + \vec{X}[(n_i-4)T]\}.$$

Using this approach one finds positions X for the next $n_i-2$ points reaching time $(2n_i-3)T$ and then repeats the process.

Another technique to obtain vector V can measure it directly by using 3×6 interferometers. In still another approach one can simply exclude V. This may be used when the time delays between the optical pulses is a multiple of T.

Operation Including Body Rotation in the Earth Frame

Figure 7:
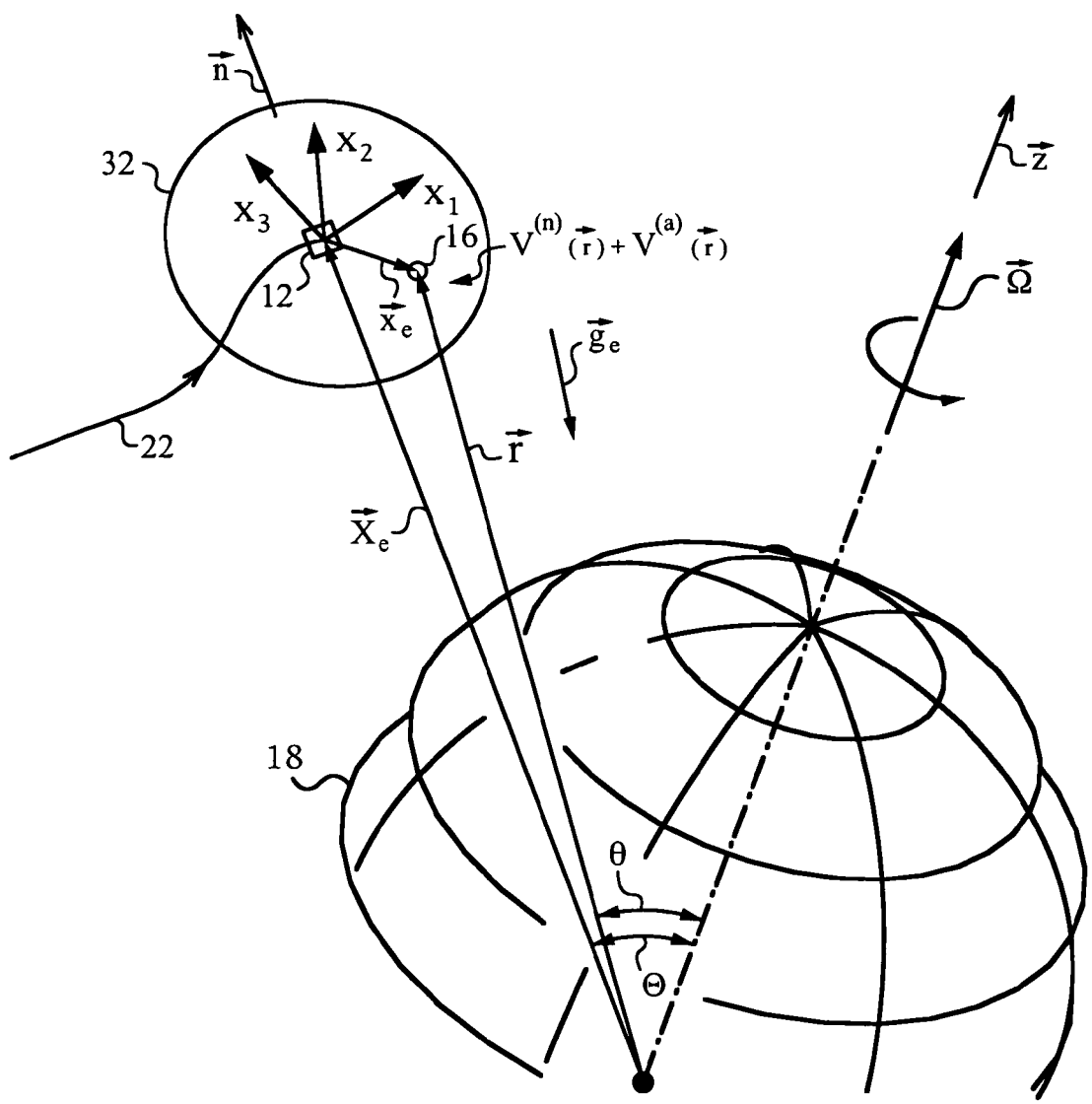
FIG. 7 is a three-dimensional diagram showing a way of practicing the method when the known frame X' is the Earth frame $X_e$.
Figure 9E:
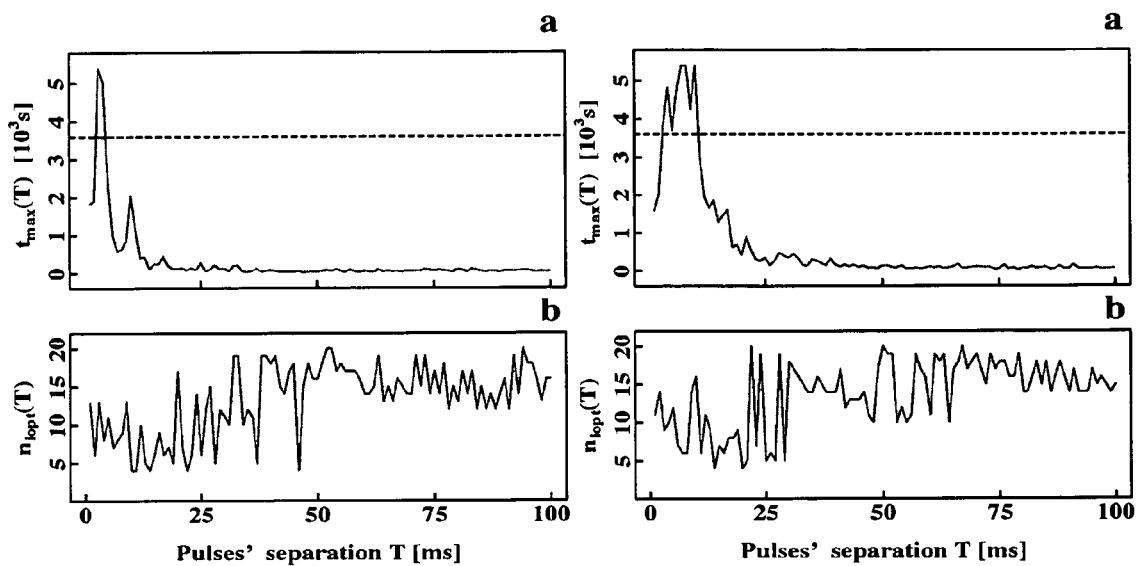
Figure 9E:
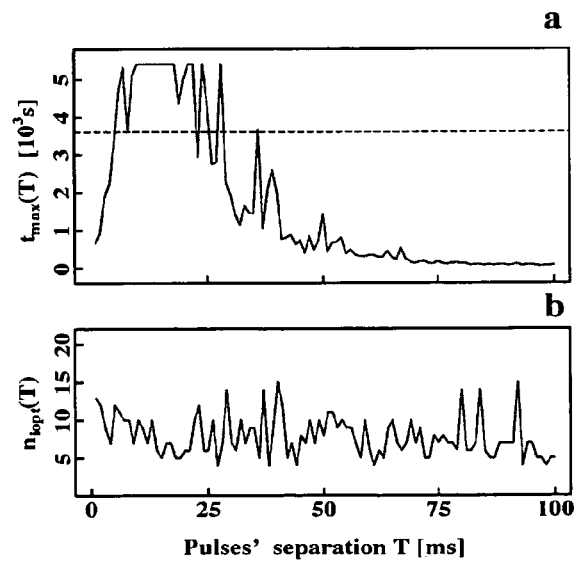
Figure 11E:
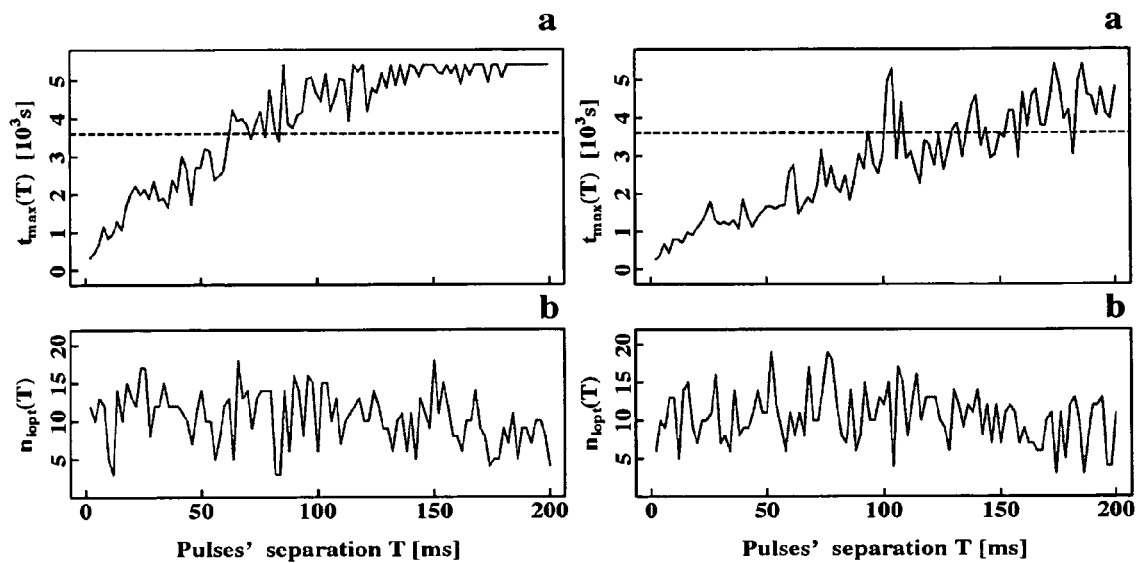
Figure 11E:
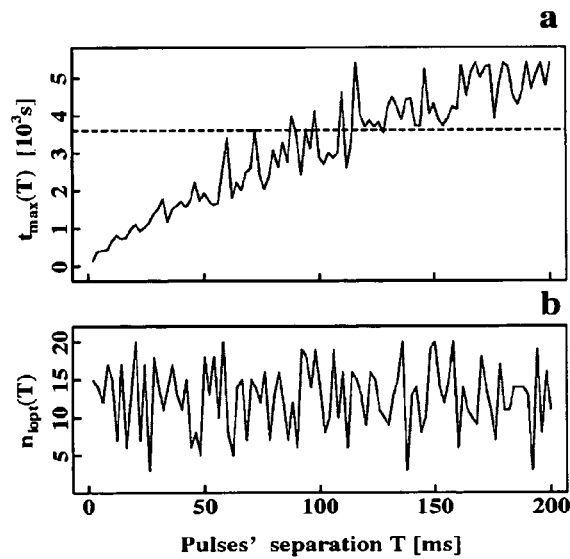
Figure 12A:
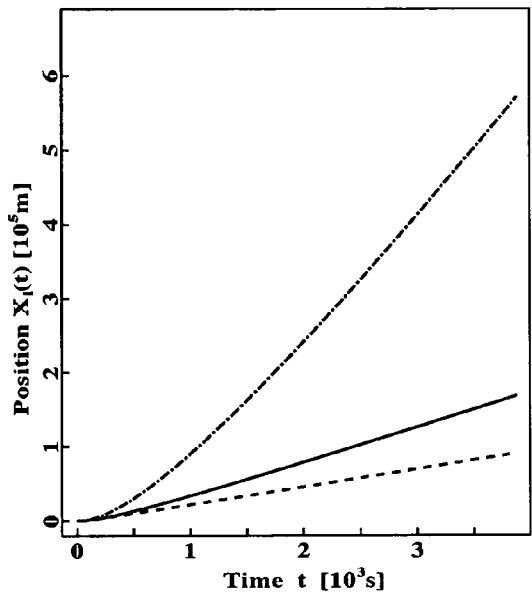
Figure 12B:
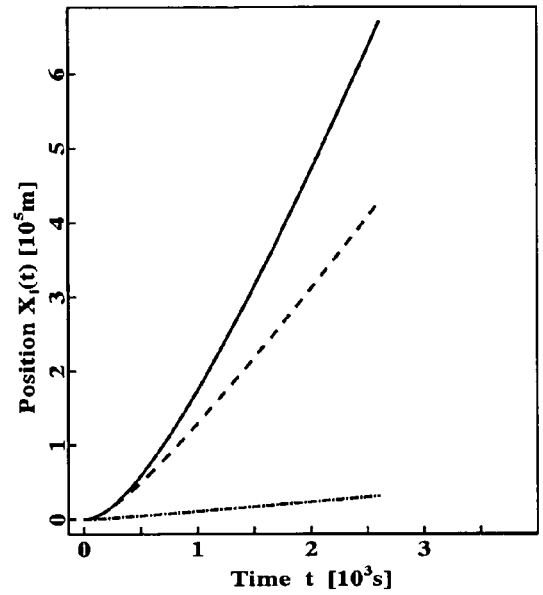
Figure 12C:
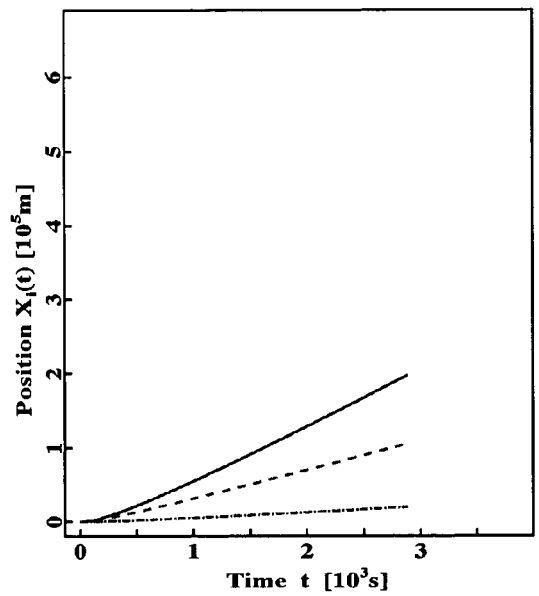
Figure 12D:
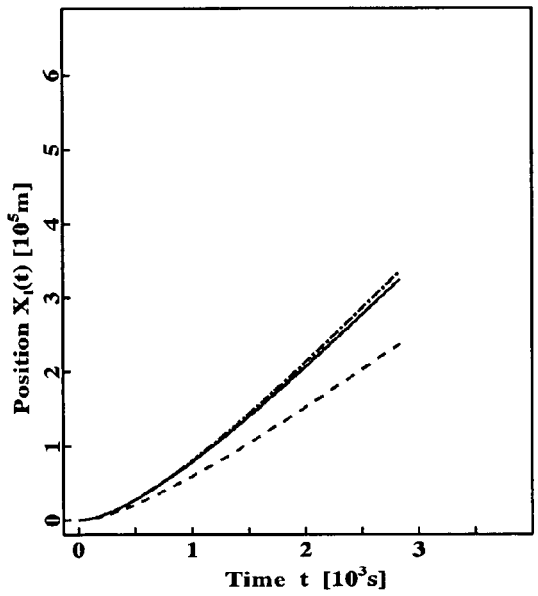
Figure 12E:
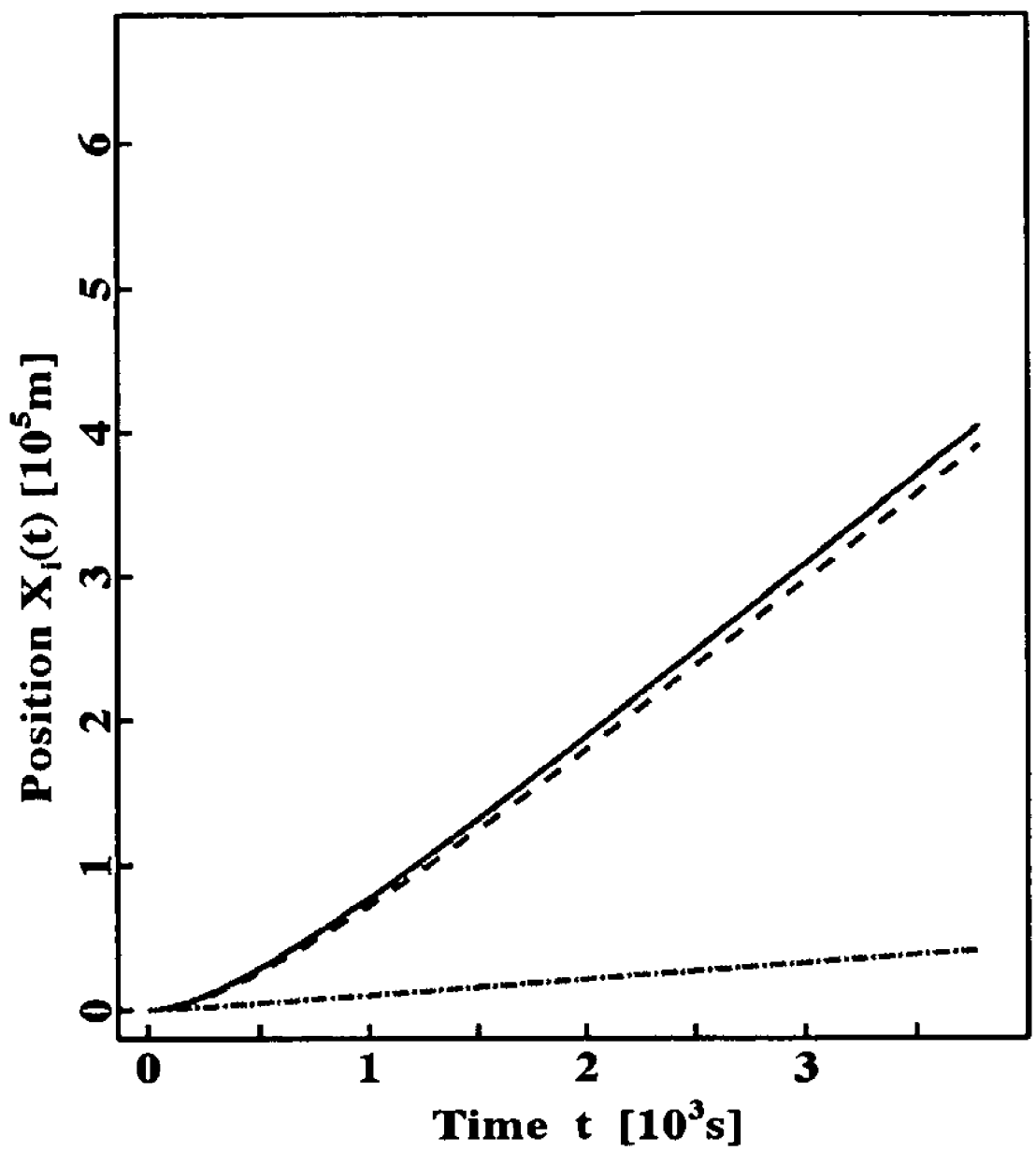

FIG. 7 illustrates an embodiment designed for terrestrial applications, i.e., situations where the interferometric method is practiced on interfering entities 16 released into the Earth frame X'. For reasons of clarity, Earth frame X' is specifically referred to as $X_e$ in FIG. 7, and the subscript "e" is used in the below equations to denote vectors and quantities expressed in the Earth frame. We will also separately number the equations in this section in order to make the method easier to follow.

We once again require that:

$$\Delta X < 5 \text{ m}, \qquad \text{Eq. 1}$$

and that the time during which this inequality is to be obeyed is:

$$t \approx 1 \text{ hr}. \qquad \text{Eq. 2}$$

For simplicity, vehicle 10 and atom interferometers 14 are not shown in this drawing and only unit 12 is indicated. We consider navigation of vehicle 10 moving in the normal gravity field $V^{(n)}(r)$ of rotating Earth 18, where the gravity potential is given by:

$$V^{(n)}(\vec{r}) = -\frac{GM}{r}\left(1 - \sum_{m=1}^{\infty} J_{2m}\left(\frac{a_E}{r}\right)^{2m} P_{2m}(\cos\theta)\right), \qquad \text{Eq. 3a}$$

$$J_{2m} = (-1)^{m+1}\frac{3e^{2m}}{(2m+1)(2m+3)}\left(1 - m\left(1 - \frac{5J_2}{e^2}\right)\right), \qquad \text{Eq. 3b}$$

where θ is the angle between vector r and the North direction (z-axis), $P_{21}(\cos\theta)$ is the Legendre polynomial, $GM=3.986004415 \cdot 10^{14}$ m$^3$s$^{-2}$ is the geocentric gravitational constant, $a_E=6378136.3$ m is the equatorial radius, $e^2=f(2-f)$ is the first eccentricity, f is the polar flattening (1/f=298.25765), and $J_2=1.0826267 \cdot 10^{-3}$ is the dynamic form factor of the Earth. Entities 16 (only one shown in FIG. 4 for reasons of clarity) move in a small vicinity 32 of point $X_e$ denoted by the vector extending to the point at which atom 16 is released from body frame X into Earth frame X'. In other words:

$$\vec{r} = \vec{X} + \vec{x}, \text{ where } x \ll X. \qquad \text{Eq. 4}$$

This constraint is important for accuracy of the method and can be ensured with a small initial velocity $v_0$ of interfering entities 16 in the body frame X and/or sufficiently small velocity V of vehicle 10.

With the constraint of entities 16 moving in small vicinity 32 during the atomic interferometric measurement, the normal gravity potential can be reformulated with the aid of the following expansions:

$$\frac{1}{r^s} = \frac{1}{X^s}\left(1 - \frac{s\vec{x}\cdot\vec{n}}{X} - \frac{s(x^2 - (s+2)(\vec{x}\cdot\vec{n})^2)}{2X^2}\right); \qquad \text{Eq. 6}$$

$$P_{2m}(\cos\theta) \approx P_{2m}(\cos\Theta) + P'_{2m}(\cos\Theta)\frac{\vec{x}\cdot(\vec{z} - \vec{n}\cos\Theta)}{X} -$$
$$\frac{1}{2X^2}\left[P'_{2m}(\cos\Theta)\left[\cos\Theta[x^2 - 3(\vec{n}\cdot\vec{x})^2] + 2(\vec{n}\cdot\vec{z})(\vec{n}\cdot\vec{x})\right] -\right.$$
$$\left. 2P''_{2m}(\cos\Theta)(\vec{x}\cdot\vec{z} - \vec{x}\cdot\vec{n}\cos\Theta)^2\right]$$

where n=X/X, z is a unit vector in the North direction, and Θ is the angle between vectors n and z, as shown in FIG. 7. Using these expansions the Earth's normal gravity potential V(r) to be expressed as follows:

$$V^{(n)}(\vec{r}) = V_0 - \vec{x}\cdot\vec{g}_e - T_{ik}x_i x_k, \qquad \text{Eq. 7}$$

where $g_e$ is the gravity acceleration and $T_{ik}$ is a gravity gradient tensor. These are given by:

$$\vec{g}_e = g(a\vec{n} + b\vec{z}), \text{ in which} \qquad \text{Eq. 8a}$$

$$g = -\frac{GM}{X^2}, \qquad \text{Eq. 8b}$$

-continued $$a = 1 - \sum_{m=1}^{\infty} J_{2m} \frac{a^{2m}}{\sin^2\Theta X^{2m}} \{[2m+1-(4m+1)\cos^2\Theta]P_{2m}(\cos\Theta) + 2m\cos\Theta P_{2m-1}(\cos\Theta)\},$$  Eq. 8c $$b = 2\sum_{m=1}^{\infty} J_{2m} \frac{ma_E^{2m}}{\sin^2\Theta X^{2m}}[P_{2m-1}(\cos\Theta) - \cos\Theta P_{2m}(\cos\Theta)], \text{ and}$$  Eq. 8d $$T_{ik} = \frac{\tau_z}{4}\left[-a\delta_{ik} + dn_in_k + ez_iz_k + \frac{f}{2}(z_in_k + z_kn_i)\right], \text{ in which}$$  Eq. 8e $$\tau_z = 2\frac{GM}{X^3},$$  Eq. 8f $$d = 3 - \sum_{m=1}^{\infty} J_{2m} \frac{a^{2m}}{\sin^4\Theta X^{2m}} \times$$  Eq. 8g
$$\{[(2m+1)(2m+3-2\cos^2\Theta)[3+14m+10m^2]+$$
$$\cos^4\Theta(4m+3)(4m+1)]P_{2m}(\cos\Theta)\}+$$
$$2m[4m+5-(4m+3)\cos^2\Theta]P_{2m}(\cos\Theta)-$$
$$2\cos\Theta P_{2m-1}(\cos\Theta)\},$$

$$e = 2\sum_{m=1}^{\infty} J_{2m} \frac{ma^{2m}}{\sin^4\Theta X^{2m}}\{[2m+1-(2m-1)\cos^2\Theta]P_{2m}(\cos\Theta) - 2\cos\Theta P_{2m-1}(\cos\Theta)\},$$  Eq. 8h $$f = 4\sum_{m=1}^{\infty} J_{2m} \frac{a^{2m}}{\sin^4\Theta X^{2m}}[-[4m+3-(4m+1)\cos^2\Theta]\cos\theta P_{2m}(\cos\Theta)+] +$$  Eq. 8i
$$2[m+1-m\cos^2\Theta][P_{2m-1}(\cos\Theta)].$$

Near the North and South poles the coefficients a, b, d, e and f have an uncertainty in this expansion and this needs to be accounted for by considering small angle θ near 0 and π radians. A standard expansion can be used to accomplish this, as will be appreciated by those skilled in the art.

In addition to the normal gravity potential of equation 3, there exists a gravity anomaly potential $V^{(a)}(r)$ that reflects the Earth's deviation from a perfect geoid. For the purposes of navigating vehicle 10 more accurately and over long trajectories, the gravity anomaly can be either measured locally or obtained from a map of the anomaly and added to the normal gravity potential. For computational purposes, the anomaly can be modeled on the assumption that it has a certain magnitude, a spatial extent and a zero average value. The simplest way to satisfy these requirements is to assume that the anomaly potential $V^{(a)}(r)$ consists of a set of harmonic terms as follows:

$$V^{(a)}(\vec{r}) = \sum_{j=1}^{n_a} h_{aj}\cos(\vec{\kappa}_{aj} \cdot \vec{r}).$$  Eq. (10)

Formally, entities 16 move in a hypoeutectic medium having a density $\rho = -4\pi\Delta V^{(a)}(r)/G \neq 0$ and could be negative. The choice in equation 10 is used for navigation purposes of the present invention. In fact, in an alternative embodiment, a map of the anomaly field can be used instead, if available and as practicable.

We characterize the gravity anomaly by two parameters, an average over space squared of the gravity anomaly accelerations $g_a$ and the scale of the harmonics in equation 10 of period $s_{ga}$. The wave vector components are then:

$$\kappa_{aji} = \pm \frac{2\pi}{s_{ga}(1+2r)}$$  Eq. 11 where r is a random number, amplitudes $h_{aj}$ are normal random variables normalized to the given value of $g_a$ squared, namely:

$$g_a^2 = \frac{\sum_{j=1}^{n_a} h_{aj}^2 \kappa_{aj}^2}{2}.$$  Eq. 12

Let us now return to entity 16 released at initial time $t_0$ and initial velocity $v_0$ in body frame X into Earth frame $X_e$. Entity 16 has a velocity $v_e$ in Earth frame $X_e$ and its position r changes with time in the Earth's rotating frame as a function of its initial velocity and the gravitational, Coriolis, centrifugal and gravity-gradient induced forces. Now, in accordance with the invention, initial velocity $v_0$ is sufficiently small that entity 16 moves in small vicinity 32 during the interferometric measurement allowing the application of equation 7 to describe the Earth's gravity potential $V^{(n)}(r)$. Therefore, the trajectory of entity 16 described by $x_e(t)$ evolves in accordance with the following expression:

$$\ddot{x}_{ei} = g_i + q_{ik}x_{ek} + 2\epsilon_{ikl}\Omega_{el}\dot{x}_{ek},$$  Eq. 13 where each superscripted dot denotes a time derivative, $\Omega_e = \Omega_e z$, $\Omega_e = 7.292115 \cdot 10^{-5} s^{-1}$ is the rate of the Earth's rotation, and the total acceleration g and gradient tensor $q_{ik}$ consist of the normal, anomaly and centrifugal terms:

$$\vec{g} = \vec{g}_e + \sum_{j=1}^{n_a} h_{aj}\vec{\kappa}_{aj}\sin(\vec{\kappa}_{aj} \cdot \vec{X}) - \vec{\Omega}_e \times (\vec{\Omega}_e \times \vec{X}),$$  Eq. 14a $$q_{ik} = 2T_{ik} + \sum_{j=1}^{n_a} h_{aj}\kappa_{aji}\kappa_{ajk}\cos(\vec{\kappa}_{aj} \cdot \vec{X}) + (\vec{\Omega}_e^2 \delta_{ik} - \Omega_{ei}\Omega_{ek}),$$  Eq. 14b where $g_e$ and $T_{ik}$ are given by equations 8a and 8e.

Now, when navigating vehicle 10 over longer periods of time, it is important not to use the approximate expression for $x_e(t)$, because after numerous steps of navigation, error builds up and violates inequality 1 in several minutes. For this reason, it is important to obtain precise expression for the trajectory $x_e(t)$ of entity 16. TO do this, we start out by noting that the eigen frequency ω of equation 13 obeys the equation:

$$|A(\omega)|=0,$$  Eq. 15a $$A_{ik}(\omega) = q_{ik} + \omega^2\delta_{ik} - 2i\omega\epsilon_{ikl}\Omega_{el},$$  Eq. 15b which, for the symmetric tensor $q_{ik}$, contains only even powers of ω, i.e., $$|A(\omega)| = a_o + a_1\omega^2 + a_2\omega^4 + \omega^6, \quad \text{Eq. 16a}$$

$$a_o = |q|, \quad \text{Eq. 16b}$$

$$a_1 = \frac{1}{2}[Tr^2(q) - Tr(q^2)] - 4q_{ik}\Omega_{ei}\Omega_{ek}, \quad \text{Eq. 16c}$$

$$a_2 = Tr(q) - 4\Omega_e^2. \quad \text{Eq. 16d}$$

Since the problem is reduced to the third order equation 16a in $\omega^2$, one can obtain an analytic expression for the trajectory. The vector:

$$\vec{y} = \begin{pmatrix} \vec{x}_e \\ \dot{\vec{x}}_e \end{pmatrix} \quad \text{Eq. 17}$$

evolves as:

$$\dot{\vec{y}} = \begin{pmatrix} 0 & 1 \\ q & -2\vec{\Omega}_e \times \end{pmatrix} \vec{y} + \begin{pmatrix} 0 \\ \vec{g} \end{pmatrix}. \quad \text{Eq. 18}$$

The solution of this equation is given by:

$$y(t) = \Phi(t)y(0) + \int_0^t dt' \Phi(t-t') \begin{pmatrix} 0 \\ \vec{g} \end{pmatrix}, \quad \text{Eq. 19a}$$

$$\Phi(t) = Y(t)Y^{-1}(0), \quad \text{Eq. 19b}$$

$$Y(t) = \{\vec{y}_1(t), \ldots \vec{y}_6(t)\}, \quad \text{Eq. 19c}$$

where $y_i(t)$ is an eigen vector of the homogeneous part of equation 18 associated with eigen frequency $\omega_i$. Evidently, $$\vec{y}_i(t) = \begin{pmatrix} \vec{x}_i \\ -i\omega_i \vec{x}_i \end{pmatrix} e^{i\omega_i t}, \quad \text{Eq. 20}$$

where $x_i(t)$ is an eigen vector of the homogeneous part of equation 13, i.e., the solution of equation $A(\omega_i)x_i=0$. One can group the six roots of equation 15a into two sub-groups $\{\omega_1,\omega_2,\omega_3\}$ and $\{-\omega_1,-\omega_2,-\omega_3\}$, where $$\omega_i = \sqrt{z_i - \frac{a_2}{3}}, \quad \text{Eq. 21}$$

$$z_1 = R_1 + R_2,$$

$$z_{2,3} = \frac{-1 \pm i\sqrt{3}}{2}R_1 + \frac{-1 \mp i\sqrt{3}}{2}R_2;$$

$$R_{1,2} = \left[-\frac{q}{2} \pm \sqrt{\frac{q^2}{2} + \frac{p^3}{27}}\right]^{1/3},$$

$$p = a_1 - \frac{a_2^2}{3},$$

$$q = \frac{2a_2^3}{27} - \frac{a_2 a_1}{3} + a_o.$$

At this point it is convenient to introduce 3×3 matrices $x_\pm = \{\vec{x}_\pm^{(1)}, \vec{x}_\pm^{(2)}, \vec{x}_\pm^{(3)}\}$, where $\vec{x}_\pm^{(i)}$ is an eigen vector associated with eigen frequency $\pm\omega_i$. Using these matrices, one can express the 6×6 matrix of equation 19c as:

$$Y(t) = \begin{pmatrix} x_+ e^{-i\tilde{\omega}t} & x_- e^{i\tilde{\omega}t} \\ -ix_+\tilde{\omega}e^{-i\tilde{\omega}t} & ix_-\tilde{\omega}e^{i\tilde{\omega}t} \end{pmatrix}, \quad \text{Eq. 22}$$

where $$\tilde{\omega} = \begin{pmatrix} \omega_1 & & \\ & \omega_2 & \\ & & \omega_3 \end{pmatrix}, \quad \text{Eq. 23}$$

to find that:

$$Y^{-1}(0) = \begin{pmatrix} [x_+ + x_-\tilde{\omega}^{-1}x_+^{-1}x_+\tilde{\omega}]^{-1} & ix_+^{-1}x_-[x_-\tilde{\omega} + x_+\tilde{\omega}x_+^{-1}x_-]^{-1} \\ \tilde{\omega}^{-1}x_-^{-1}x_+\tilde{\omega}[x_+ + x_-\tilde{\omega}^{-1}x_+^{-1}x_+\tilde{\omega}]^{-1} & -i[x_-\tilde{\omega} + x_+\tilde{\omega}x_+^{-1}x_-]^{-1} \end{pmatrix}. \quad \text{Eq. 24}$$

Representing matrix 19b by 3×3 blocks, $$\Phi(t) = \begin{pmatrix} \Phi_{11}(t) & \Phi_{12}(t) \\ \Phi_{21}(t) & \Phi_{22}(t) \end{pmatrix},$$

one obtains the following relevant blocks:

$$\Phi_{11}(t)=[x_+ e^{-i\tilde{\omega} t}+x_- e^{i\tilde{\omega} t}\tilde{\omega}^{-1}x_-^{-1}x_+\tilde{\omega}]/[x_+ + x_-\tilde{\omega}^{-1}x_-^{-1}x_+\tilde{\omega}]^{-1}, \quad \text{Eq. 25a}$$

$$\Phi_{12}(t)=i[x_+ e^{-i\tilde{\omega} t}x_+^{-1}x_+ - x_- e^{i\tilde{\omega} t}]/[x_-\tilde{\omega}+x_+\tilde{\omega} x_+^{-1}x_-]^{-1}, \quad \text{Eq. 25b}$$

Thus using representation 17 we derive expressions 25 which can be integrated over t' in equation 19a to arrive at the following final result:

$$\vec{x}_e(t) = x_x(t)\vec{x}_e(0) + x_v(t)\vec{v}_e(0) + x_g(t)\vec{g}, \quad \text{Eq. 26a}$$

$$x_x(t)=[x_+ e^{-i\tilde{\omega} t}+x_- e^{i\tilde{\omega} t}\tilde{\omega}^{-1}x_-^{-1}x_+\tilde{\omega}]/[x_+ + x_-\tilde{\omega}^{-1}x_-^{-1}x_+\tilde{\omega}]^{-1}, \quad \text{Eq. 26b}$$

$$x_v(t)=i[x_+ e^{-i\tilde{\omega} t}x_+^{-1}x_- - x_- e^{i\tilde{\omega} t}]/[x_-\tilde{\omega}+x_+\tilde{\omega} x_+^{-1}x_-]^{-1}, \quad \text{Eq. 26c}$$

$$x_g(t)=[x_+(1-e^{-i\tilde{\omega} t})\tilde{\omega}^{-1}x_+^{-1}x_- + x_-(1-e^{i\tilde{\omega} t})\tilde{\omega}^{-1}]/[x_-\tilde{\omega}+x_+\tilde{\omega} x_+^{-1}x_-]^{-1}. \quad \text{Eq. 26d}$$

In the absence of the gravity gradient terms equation 15a becomes degenerate. In principle, one can get the solution in this case from equation 26 in the limit:

$$T_{ik} \to 0. \quad \text{Eq. 27}$$

A simpler way involves using the Hamiltonian equations of motion instead of Lagrangian equation 13. In the present case, for the trajectory $x_e(t)$ of entity 16 in Earth frame $X_e$ absent the gravity gradient we obtain:

$$\vec{x}_e(t) = -\vec{z} \times \{t(\vec{z} \times \vec{v}_e(0)\cos\Omega_e t + \vec{v}_e(0)\sin\Omega_e t) + \\ \Omega_e^{-2}[\vec{z} \times \vec{g}(\cos\Omega_e t + \Omega_e t \sin\Omega_e t - 1) + \\ \vec{g}(\sin\Omega_e t - \Omega_e t \cos\Omega_e t)]\} + \\ \vec{z}\left[\vec{z} \cdot \left(\vec{v}_e(0)t + \frac{1}{2}\vec{g}t^2\right)\right] \quad \text{Eq. 28}$$

where we assume that $x_e(0)=0$.

Now, to obtain the phases we consider that entity 16 is launched at moment $t_0$ from the point d with velocity v and exposed to optical pulses 24 at times:

$$t=t_0+t_1, t_0+t_1+T, t_0+t_1+2T \quad \text{Eq. 29}$$

using the π/2-π-π/2 sequence of Raman pulses having the effective wave vector k. The phase of this atom interferometer is thus given by:

$$\phi(\vec{k}, \vec{v}, \vec{d}, t_o, t_1) = \vec{k} \sum_{j=0}^{2} \kappa_j \vec{x}(t_o + t_1 + jT), \quad \text{Eq. 30}$$

where $$\kappa_j = 1, -2, 1 \quad \text{Eq. 31}$$

for $$j = 0, 1, 2$$

correspondingly, and x(t) is the atomic trajectory in body frame X. Since after launching entity 16 is decoupled from vehicle 10 and affected only by the Earth gravitational and inertial forces, it is easier to work with atom trajectory in the Earth frame $X_e$ with consequent transition to body frame X only at times when Raman pulses 24 are applied, i.e., at the times of equation 29. Besides avoiding the consideration of inertial forces in body frame X, this also allows us to express the interferometer phase directly through vehicle 10 position and orientation.

Assuming that X(t) is the position of the origin of body frame X of vehicle 10, R(t) is the rotation matrix describing the orientation of the axes of body frame X, and $x_e(t-t_0)$ is the position of entity 16 in Earth frame $X_e$ with respect to origin of body frame X at the time of launching, $X(t_0)$, then the trajectory of entity 16 in body frame X is given by:

$$\vec{x}(t)=R(t)[\vec{x}_e(t-t_0)+\vec{X}(t_0)-\vec{X}(t)]. \quad \text{Eq. 32}$$

Taking into account the initial condition that entity 16 is launched at moment to from the point d, i.e., $x(t_0)=d$, we find:

$$\vec{x}_e(0)=R^{-1}(t_0)\vec{d}. \quad \text{Eq. 33}$$

The velocity vector $v_e$ of entity 16 in Earth frame $X_e$ can be obtained now by differentiating equation 32 at $t=t_0$ and using the fact that $\vec{x}(t_0)=\vec{v}_0$, to find that at the time of launching:

$$\vec{v}_e(0)=\vec{V}(t_0)+R^{-1}(t_0)[\vec{v}_0+\vec{\Omega}(t_0)\times\vec{d}]. \quad \text{Eq. 34}$$

Using the above expressions and employing an alternative expression for entity 16 trajectory in Earth frame $X_e$ as follows:

$$\vec{x}_e(t-t_0)=R^{-1}(t_0)\vec{d}+[x_v(t)\vec{v}_e(0)+x_g(t)\vec{g}]_{\vec{X}=\vec{X}(t_0)+R^{-1}(t_0)\vec{d}}, \quad \text{Eq. 35}$$

which yields the final expression for the interferometer phase:

$$\phi(\vec{k}, \vec{v}, \vec{d}, t_o, t_1) = \vec{k} \sum_{j=0}^{2} \kappa_j R(t_o + t_1 + jT) \quad \text{Eq. 36}$$

$$\left\{ \begin{array}{l} R^{-1}(t_o)\vec{d} + \vec{X}(t_o) - \\ \vec{X}(t_o + t_1 + jT)x_v(t_o + t_1 + jT) \end{array} \right.$$

$$\left[\vec{V}(t_o) + R^{-1}(t_o)(\vec{v} + \vec{\Omega}(t_o) \times \vec{d})\right] +$$

$$\left. x_g(t_o + t_1 + jT)\vec{g}\right\}_{\vec{X}=\vec{X}(t_o)+R^{-1}(t_o)\vec{d}}$$

Performance Examples

The method of invention can be used to restore the rotation matrix for any given body trajectory and rotation under the influence of noise. Since we can restore body orientation independently, as described above, we first examine the performance of rotation matrix R(t) restoration under a relative inaccuracy defined as:

$$\Delta R(t) \equiv \sqrt{\frac{Tr\{[R(t)-R_e(t)]^T[R(t)-R_e(t)]\}}{3}}, \quad \text{Eq. 37}$$

where R(t) is the exact rotation matrix. The recurrent relation causes the roundoff errors for rotation matrix R(t) to increase slowly in time when one performs the calculations with quadrupole precision. Examples of the dependencies ΔR(t) are shown in FIG. 8. They were obtained for a time delay T=5 ms between optical pulses, minimal number of interpolation points $n_i=3$, and body acceleration on the order of g (scale parameter $s_c=1$). Using exact body trajectory and rotation matrices we calculated the phases of the basic and additional atom interferometers. Their difference was used in the analogue of equation 17 (see above section entitled "Operation including body rotation in an inertial frame with a homogeneous gravity field") valid for a finite rotation matrix to restore R(t). In addition, we inserted into the input phases a random term $\delta\phi_r$, chosen homogeneously from the interval:

$$|\delta\phi_r| \le \frac{\delta\phi}{2} \qquad \text{Eq. 38}$$

From the results, we see that the roundoff error (for $\delta\phi=0$) does not exceed:

$$\Delta R(t) \le 1.9 \times 10^{-21}, \qquad \text{Eq. 39}$$

while the rather moderate level in phase inaccuracy $\delta\phi=10^{-3}$ leads to an orientation inaccuracy of:

$$\Delta R(t) \le 3.9 \times 10^{-8} = 2.2 \ \mu\text{deg.} \qquad \text{Eq. 40}$$

To restore body position X(t) we varied time delay T between pulses from 1 ms to 100 ms with a step of 1 ms. For each value of T we varied the number of points $n_i$ from 3 to 20. For any given T and $n_i$ we restored body position and rotation matrix in time until the requirement of $\Delta X(t) \le 5$ m was violated or up to a maximum time of 1.5 hours. We determined an optimum number $n_{iopt}(T)$ and maximum value of time $t_{max}(T)$.

We considered two types of body motion; oscillatory motion and pulsed motion. Examples of oscillatory trajectories as restored are shown in FIG. 10. We introduced a scale parameter sc such as typical body acceleration is on the order of $s_c g$. Calculations have been performed for scale factors $s_c=1, 0.5, 0.25$ and $0.1$. For the last scale factor value of 0.1, the program was run for five different sets of acceleration and rotation matrices. Dependencies $n_{iopt}(T)$ and $t_{max}(T)$ are shown in FIGS. 9A-E. We see that restoration of body trajectory occurs for time delay T between pulses and number of interpolation points $n_i$ on the order of:

$$T \approx 6\text{-}10 \text{ ms}, \ n_i \approx 4\text{-}17. \qquad \text{Eq. 41}$$

Example of exact body trajectory and that restored with the method of invention is shown in FIG. 10.

In another example, it was assumed that the body was accelerated and rotated only by a pulse applied at the start. For the pulse of acceleration we chose the Lorentz shape:

$$a_{si}(t) = a_{0i} \frac{\tau_{si}^2}{t^2 + \tau_{si}^2}, \ \tau_{si} \in \{0, 600s\}, \qquad \text{Eq. 42}$$

which corresponds to the smooth part of the body trajectory:

$$X_{si} = a_{0i}\tau_{si}\left[t - \tau \ln\left(\frac{t+\tau}{\tau}\right)\right]. \qquad \text{Eq. 43}$$

For a pulse in the Euler angle $\alpha$ we chose:

$$a(t) = a_m \frac{16t^2\tau_\alpha^2}{(t^2+\tau_\alpha^2)^2}, \ \tau_\alpha \in \{0, 600s\}, \ \tau_m \in \{0, 2\pi\}, \qquad \text{Eq. 44}$$

and the same pulses for angles $\beta$ and $\gamma$, except that the maximum value of $\beta$ did not exceed $\pi$ ($\beta_m \in \{0,\pi\}$).

As in the case of oscillatory motion, numerical calculation shows reliable restoration of body trajectory during 1 hour for scaling factor $s_c=0.1$. The relationship between the optimum number of interpolation points $n_{iopt}(T)$ and maximum time $t_{max}(T)$ after which the error in body position surpassed 5 m is shown in FIGS. 11A-E. The trajectories are found in FIGS. 12A-E.

One concludes that for the pulsed trajectory the time delay T between Raman pulses and the number of interpolation points can be on the order of:

$$T \approx 150\text{-}200 \text{ ms}, \ n_i \approx 3\text{-}20. \qquad \text{Eq. 45}$$

For the case of a body moving in the Earth frame $X_e$, simulations of the navigation process have been performed using equations 26 and 36 with basic and additional interferometers. Typical examples of simulations for five different trajectories are shown in FIGS. 13 and 14 for the case when the angle of body rotation $\phi_i(t)$ don't exceed $10^{-5}$ radians and the error in the interferometer phase measurement in on the order of $10^{-4}$. Under these assumptions, FIG. 13 shows the dependence of the maximum time navigation on the time delay between Raman pulses. FIG. 14 shows the build up of error in body position, body velocity and gravity acceleration during the navigation process.

Based on the above embodiments and specific examples, it will be clear to a person skilled in the art that the method and apparatus of invention admit of many variations. Moreover, the method can be practiced in various types of known frames in addition to those described above. Therefore, the scope of invention should be judged based on the appended claims and their legal equivalents.

We claim:

1. A method for determining coordinates of a body:
   a) providing atom interferometers in a body frame X;
   b) releasing interfering entities into a known frame X' decoupled from said body frame X;
   c) applying an optical pulse sequence to said interfering entities to affect matter-wave phases of said interfering entities as a function of said coordinates;
   d) determining said coordinates from phases of said atom interferometers.

2. The method of claim 1, wherein said optical pulse sequence comprises a $\pi/2$-$\pi$-$\pi/2$ sequence.

3. The method of claim 1, wherein said optical pulse sequence comprises a Raman pulse sequence.

4. The method of claim 1, wherein said atom interferometers are triggered at regular time intervals.

5. The method of claim 1, wherein said interfering entities are selected from the group consisting of atoms, ions and molecules.

6. The method of claim 5, wherein said interfering entities comprise atoms released in the form of a gas cloud.

7. The method of claim 1, wherein said atom interferometers comprise basic atom interferometers for operating on interfering entities released at an initial time $t_0$ and a zero initial velocity $v_0=0$ in said body frame X.

8. The method of claim 7, wherein said atom interferometers comprise additional atom interferometers for operating on interfering entities released at said initial time $t_0$ and at a non-zero initial velocity $v_0 \ne 0$ in said body frame X.

9. The method of claim 8, wherein body rotation matrices R are determined from phase differences between said basic atom interferometers and between said additional atom interferometers, and from rotation matrices R restored for preceding measurement times.

10. The method of claim 7, wherein body coordinates are determined from the phases of said basic atom interferometers, restored rotation matrices R, body coordinates restored for preceding measurement times and body velocities at the times of releasing said interfering entities.

11. The method of claim 1, wherein a velocity of said body at the time of releasing said interfering entities for subsequent atom interferometeric measurements is obtained by interpolation from restored body positions and said optical pulse sequence is applied with a time delay.

12. The method of claim 1, wherein said known frame X' is the Earth frame $X_e$.

13. The method of claim 12, wherein an initial velocity of said interfering entities in Earth frame $X_e$ is sufficiently small to allow the Earth's normal gravity potential V(r) to be expressed by the following expression:

$$V^{(n)}(\vec{r}) = V_0 - \vec{x} \cdot \vec{g}_e - T_{ik} x_i x_k$$

where $g_e$ is gravity acceleration and $T_{ik}$ is gravity gradient tensor.

14. The method of claim 12, wherein Earth's gravity potential is composed of a normal gravity potential $V^{(n)}(r)$ and an anomalous gravity potential $V^{(a)}(r)$.

15. An apparatus for determining coordinates of a body, said apparatus comprising:
   a) atom interferometers in a body frame X;
   b) interfering entities released into a known frame X' decoupled from said body frame X;
   c) a source for applying an optical pulse sequence to said interfering entities to affect matter-wave phases of said interfering entities as a function of said coordinates;
   d) a unit for determining said coordinates from phases of said atom interferometers.

16. The apparatus of claim 15, wherein said atom interferometers comprise basic atom interferometers for operating on said interfering entities released at an initial time $t_0$ and a zero initial velocity $v_0=0$ in said body frame.

17. The apparatus of claim 15, wherein said atom interferometers comprise additional atom interferometers for operating on said interfering entities released at an initial time $t_0$ and a non-zero initial velocity $v_0 \neq 0$ in said body frame.

18. The apparatus of claim 15, wherein said body is a vehicle.

19. The atom interferometer of claim 15, wherein said interfering entities are selected from the group consisting of atoms, ions and molecules.

20. The atom interferometer of claim 15, wherein said known frame X' is the Earth frame $X_e$.

* * * * *